United States Patent
Vermeulen

(10) Patent No.: US 10,202,162 B2
(45) Date of Patent: Feb. 12, 2019

(54) SYSTEM FOR PACKING A HUMAN-POWERABLE WHEELED VEHICLE

(71) Applicant: Bert Vermeulen, Cheyenne, WY (US)

(72) Inventor: Bert Vermeulen, Cheyenne, WY (US)

(*) Notice: Subject to any disclaimer, the term of this patent is extended or adjusted under 35 U.S.C. 154(b) by 65 days.

(21) Appl. No.: 15/230,487

(22) Filed: Aug. 8, 2016

(65) Prior Publication Data

US 2016/0339981 A1   Nov. 24, 2016

Related U.S. Application Data

(63) Continuation-in-part of application No. 14/544,975, filed on Mar. 11, 2015, now Pat. No. 9,440,486.
(Continued)

(51) Int. Cl.
*B62K 15/00* (2006.01)
*B60B 1/00* (2006.01)
(Continued)

(52) U.S. Cl.
CPC ............ *B62K 15/008* (2013.01); *B60B 1/003* (2013.01); *B60B 1/041* (2013.01); *B60B 1/042* (2013.01);
(Continued)

(58) Field of Classification Search
CPC .............. B62K 15/00; B62K 2015/001; B62K 2015/003; B62K 2015/005; B62K 15/006; B62K 15/008
See application file for complete search history.

(56) References Cited

U.S. PATENT DOCUMENTS

| 578,350 A | 3/1897 | McCain |
| 605,870 A | 6/1898 | Gubelmann |
(Continued)

FOREIGN PATENT DOCUMENTS

| EP | 2628673 | 8/2013 |
| WO | 20100048723 | 5/2010 |

OTHER PUBLICATIONS

Airnimal Folding Bikes, Airnimal Chameleon B&W Clapton Case Fold, Video on www.youtube.com/watch?v=87CjA-PTsT4, Published: Jul. 11, 2013.
(Continued)

*Primary Examiner* — James A Shriver, II
*Assistant Examiner* — James J Triggs

(57) ABSTRACT

A system and method for packing a human-powerable vehicle uses two frame sections that pivot about a horizontal axis parallel to the central axis of the bottom bracket housing cylinder to convert from a rideable configuration to a packed configuration. The pivot axis for folding the two frame sections is located forward of a main seat tube and above a bottom bracket housing that are permanently and rigidly attached to each other and to rear stays for holding a rear wheel. The bottom of the main seat tube is located forward of the bottom bracket housing on the rear frame section. The front frame section rotates downward and clockwise, when looked at from the starboard side, through a rotation of approximately of about 180 degrees to convert from a rideable configuration to a packed configuration. A detachable connection located above the pivot axis rigidly secures the front frame section to the rear frame section when the frame is in a rideable configuration.

20 Claims, 22 Drawing Sheets

Related U.S. Application Data

(60) Provisional application No. 62/299,342, filed on Feb. 24, 2016, provisional application No. 61/951,826, filed on Mar. 12, 2014.

(51) Int. Cl.
  *B60B 27/02* (2006.01)
  *B60B 1/04* (2006.01)

(52) U.S. Cl.
  CPC ........ *B60B 27/023* (2013.01); *B60B 2320/10* (2013.01); *B60B 2900/531* (2013.01); *B60Y 2200/13* (2013.01)

(56) References Cited

U.S. PATENT DOCUMENTS

| | | | |
|---|---|---|---|
| 1,410,047 A | 3/1922 | Williams | |
| 1,511,291 A | 10/1924 | McGrath | |
| 1,593,474 A | 7/1926 | Serrao | |
| 2,297,960 A | 10/1942 | Hood | |
| 2,447,956 A | 8/1948 | Morders | |
| 2,917,816 A | 12/1959 | Samson | |
| 3,304,099 A | 2/1967 | Jankowski | |
| 3,329,444 A | 7/1967 | Lidov | |
| 3,922,018 A | 11/1975 | Shook | |
| 3,929,225 A * | 12/1975 | Locke | B65D 5/5038 206/335 |
| 4,149,634 A * | 4/1979 | Lewis, Jr. | B65D 85/68 206/335 |
| 4,154,327 A | 5/1979 | Haeussinger | |
| 4,182,522 A | 1/1980 | Ritchie | |
| 4,252,335 A | 2/1981 | Brenner | |
| 4,353,464 A * | 10/1982 | Bentler | B65D 85/68 206/303 |
| 4,462,606 A | 7/1984 | Hon | |
| 4,756,416 A * | 7/1988 | Johnson | B62J 99/00 190/107 |
| 5,052,706 A | 10/1991 | Tsai et al. | |
| 5,205,573 A | 4/1993 | Mhedhbi | |
| 5,419,619 A | 5/1995 | Lew | |
| 5,553,950 A | 9/1996 | Pawsat et al. | |
| 5,586,652 A | 12/1996 | Smilanick | |
| 5,647,643 A | 7/1997 | Noble | |
| 5,810,453 A | 9/1998 | O'Brien | |
| 5,813,770 A | 9/1998 | Chiang | |
| 5,975,551 A | 11/1999 | Montague et al. | |
| 6,030,052 A | 2/2000 | Watarai et al. | |
| 6,267,237 B1 * | 7/2001 | McNeill | B65D 85/68 206/335 |
| 6,364,424 B1 | 4/2002 | Lashlee et al. | |
| 6,374,975 B1 | 4/2002 | Schlanger | |
| 6,702,312 B1 | 3/2004 | Miksik | |
| 6,886,844 B2 | 5/2005 | Ritchey | |
| 6,929,277 B2 | 8/2005 | Chao | |
| 7,125,029 B2 | 10/2006 | Knox | |
| 7,357,460 B2 | 4/2008 | Schlanger | |
| 7,490,842 B1 | 2/2009 | Ulrich et al. | |
| 7,658,450 B2 | 2/2010 | Mercat et al. | |
| 7,665,928 B2 | 2/2010 | Winefordner et al. | |
| 7,874,625 B2 | 1/2011 | Addink | |
| 7,909,412 B2 | 3/2011 | Ashman | |
| 7,942,434 B2 | 5/2011 | Myers | |
| 7,950,747 B2 | 5/2011 | Mercat et al. | |
| 8,007,052 B2 | 8/2011 | Passarotto et al. | |
| 8,052,225 B2 | 11/2011 | Inoue et al. | |
| 8,113,529 B2 | 2/2012 | Spahr et al. | |
| 8,113,593 B2 | 2/2012 | Spahr et al. | |
| 8,123,243 B2 | 2/2012 | Ho | |
| 8,141,893 B2 | 3/2012 | Lin | |
| 8,162,344 B2 | 4/2012 | Hoogendoorn | |
| 8,205,902 B2 | 6/2012 | Ulimonen et al. | |
| 8,251,460 B2 | 8/2012 | Veux | |
| 8,308,178 B2 | 11/2012 | Hoerdum et al. | |
| 8,371,659 B2 | 2/2013 | Fitzsimons | |
| 8,414,006 B2 | 4/2013 | Souvanny | |
| 8,430,414 B1 | 4/2013 | Yap | |
| 8,485,335 B2 | 7/2013 | Schlanger | |
| 8,882,124 B2 | 11/2014 | Yap | |
| 8,894,084 B1 | 11/2014 | Yap | |
| 9,266,579 B2 | 2/2016 | Yap | |
| 9,446,896 B2 * | 9/2016 | Pelegrin | B62B 3/04 |
| 9,821,948 B2 * | 11/2017 | Noer | B65D 85/68 |
| 2007/0187922 A1 | 8/2007 | Boutakis | |
| 2010/0052410 A1 | 3/2010 | Sherman et al. | |
| 2011/0049966 A1 | 3/2011 | Sartin et al. | |

OTHER PUBLICATIONS

Mark Sharon, Bike Review—Airnimal Chameleon, Downloaded from www.daily peloton.com/displayarticle.asp?pk=12871, Published: Jun. 16, 2008.

* cited by examiner

SYSTEM FOR PACKING A HUMAN-POWERABLE WHEELED VEHICLE

This application claims benefit of U.S. Provisional Patent Application Ser. No. 62/299,342 filed 24 Feb. 2016, and is a continuation in part of U.S. patent application Ser. No. 14/544,975 filed 11 Mar. 2015, which claims benefit of U.S. Provisional Patent Application Ser. No. 61/951,826 filed 12 Mar. 2014, the entire disclosures of which are incorporated by reference herein.

BACKGROUND

This disclosure relates to systems and methods for improving the ability to pack a human-powerable wheeled vehicle when it is not being ridden. Human-powerable wheeled vehicles can include unicycles, bicycles, tricycles, quadricycles, wheelchairs, strollers, and powered versions of these vehicles (such as e-bikes) that can use human power in addition to other power sources, such as electricity and gasoline engines.

Human-powerable vehicles typically use space frame geometries for strength and stiffness to minimize weight, but space frame structures occupy a large volume, which is undesirable for storage and transport. Wheels that have spokes in tension between a hub and a rim are an example of a space frame that is difficult to pack due to the conical bulge and axle in the wheel center (hub region). Two assembled wheels with conical centers do not easily pack together into a small space. Separately, however, the wheel components (spokes, rims, tires, and hubs) occupy little volume before being assembled as a wheel.

Wheeled human-powerable vehicles might need to be moved long distances by cars, public transit (buses, trains, etc.), airplanes, boats, or other modes of transport. In such situations, it is beneficial for the bike (or similar) to be packed, protected from impact, and covered to protect other luggage from sharp or dirty elements of the bike. The packed human-powerable vehicle might also need to be carried or rolled in a "packed mode" in places such as an airport, bus terminal, or train station. Additionally, such vehicles in a compact configuration can be stored and locked more easily than when in a "ready to ride mode".

One example is the transport of bicycles on commercial aircraft. In the past, airlines allowed passengers to check bicycles at no extra charge and even supplied free bicycle boxes. Now, many airlines charge for each piece of checked luggage. They charge even more for oversize items (typically specified as length+width+height greater than 62 linear inches) and/or overweight items (typically more than 50 pounds). Airlines might refuse to take the bike or other human-powered vehicle if not properly packed. The airline is generally not responsible for damage during transit. Observation of how luggage is handled shows that a packed bike must be able to take impacts from all directions. The packed unit must be openable and searchable by airport security personnel. The objective is a safely and securely packed bike (or similar) that fits the 62 linear inch limit and weighs as little as possible.

Folding bike embodiments with small wheels and tires (20 inch or less) generally don't perform as well on a variety of road surfaces and terrain as bicycles with full-size wheels. In this disclosure, full-size wheels are defined as wheels with a nominal outside tire diameter of 24 inches or greater and small wheels have tires nominally 20 inches in diameter or smaller. Here is a list of common small and full wheel and tire sizes:

| Common name (nominal outside diameter of tire) | Outside diameter of rim | Bead seat diameter (inside diameter of tire) |
|---|---|---|
| 700C/29 inch | 648 mm (25.5 inches) | 622 mm (24.5 inches) |
| 650B/27.5 inch | 610 mm (24 inches) | 584 mm (23 inches) |
| 26 inch | 585 mm (23 inches) | 559 mm (22 inches) |
| 24 inch | 533 mm (21 inches) | 507 mm (20 inches) |
| 20 inch | 477 mm (19 inches) | 451 mm (18 inches) |
| 20 inch | 432 mm (17.75 inches) | 406 mm (16.25 inches) |
| 16 inch | 375 mm (14.75 inches) | 349 mm (13.75 inches) |

Some bicycles with small wheels use ingenious folding arrangements to convert from a compact to a ridable configuration quickly, cleanly, and without the use of tools. Some small wheel bikes fold small enough to fit into a rectangular volume that meets the 62 linear inch size requirement and 50-pound weight limit. It is much easier to fit into 62 linear inches when the wheel is less than one third of the total length+width+height, which is what occurs when the nominal outside diameter of the tire is 20 inches or less.

There are bicycles with full-size wheels that can pack into the 62 linear inches, but these bicycles require time, tools, and expertise to disassemble and reassemble. Packing these bikes with full-size wheels into 62 linear inches is difficult. Referring to the list of bike wheel sizes, a typical road bike uses 700C wheels, with an outside tire diameter between 27 and 29 inches, and an outside rim diameter of approximately 25.5 inches. Thus, the typical target packed size for these bikes is 26×26×10 inches. It takes removing the air from the tires, many disassembly steps, detailed instructions, tools, covers to wrap each part, and patience to pack all the parts into these dimensions and prevent damage in transport.

One problem with trying to fit a bike with full-size wheels into the airline maximum of 62 linear inches is that the wheels are both large in diameter and fat in the center due to the use of tension spokes in a triangular configuration, when looked at in cross section or a conical configuration when viewed three dimensionally. The spokes typically terminate in a set of holes in one plane in the rim and terminate in two parallel planes in a circular configuration in the hub. When looked at in cross section this looks like a triangle that is wide at the hub and narrow at the rim. When two wheels with fat centers are put into a 26×26×10 inch case, there is little room for anything else. Space saved by having the wheels stored more compactly could simplify packing the other bicycle parts. It is known to have wheels that are disassemblable to save space, but disassemblable wheels typically do not use spokes in tension in a triangular/conical configuration. Wheels with triangular/conical tension spokes in are desired because this space frame configuration has a high strength to weight ratio, and weight is paramount for a human-powerable vehicle.

Many bicycles that are transported as checked luggage require a structural case, which adds to total luggage weight. There is also the issue of what to do with the case when one arrives at a destination and wants to start riding. It is better if the bike is packable in a compact arrangement that needs minimal or no external container solely for transport.

To summarize, the goal is a system/method for packing a human-powerable vehicle that (a) fits the entire vehicle/bike into one piece of luggage, is (b) lightweight, (c) fits within applicable size restrictions, (d) is quick to pack and unpack; and (e) requires minimal tools and packaging. (f) Ideally, such a system would not require a separate structural suitcase.

BRIEF DESCRIPTION OF THE DRAWINGS

The present disclosure is described in conjunction with the appended figures in which.

Figure 1A:
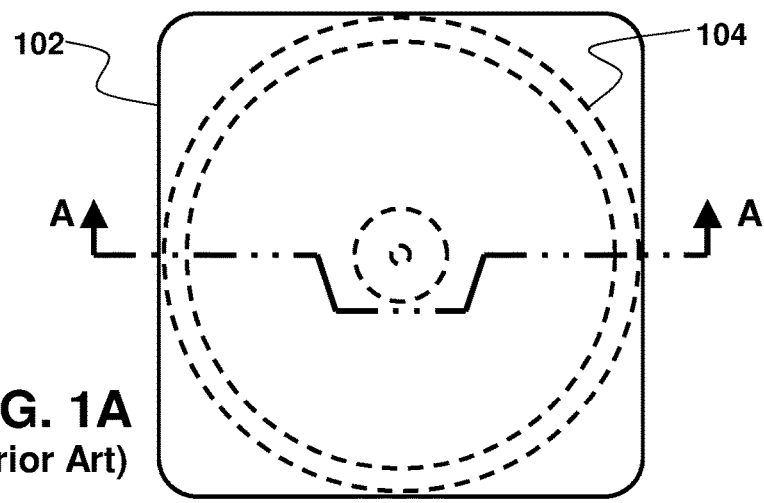
FIG. 1A shows a top view of two spoked 700C bicycle wheels in a 26×26×10 inch container.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, those skilled in the art will know that different materials, manufacturing processes, fastening systems, configurational arrangements, and components may be substituted.

1. Definitions.

In one embodiment, the system and/or method is for a wheeled human-powerable vehicle. For purposes of this disclosure and the appended claims, a wheeled human-powerable vehicle is defined as any vehicle having wheels that is configured for a human to add or exclusively provide locomotive power. Examples include bicycles, motor-assisted bicycles (such as mopeds, e-bikes, etc), wheelchairs, tricycles, unicycles, quadricycles, tandems, etc. In this disclosure and the appended claims, the term bicycle (or bike) is used to describe a human powerable vehicle having two main wheels that is configured to transport a human. The term bicycle includes tandems, recumbents, bicycles with training wheels, and any other combination of a plurality (at least two) wheels, with any attachment between them, or no other components or attachment between them. Thus, a bicycle also comprises any pair of wheels, with or without any other components.

In one embodiment, the system and/or method being disclosed comprise an annulus, annular module, or ring-shaped module. For purposes of this disclosure and the appended claims, an annulus (or annular module) shall include any ring-shaped structure having a central region in the form of opening or aperture that facilitates the nesting of components partially or completely inside of one another. An annulus can be monolithic. An annulus can be assembled from multiple components. An annulus can be substantially flat with all features lying in one flat plane having a thickness many times smaller than the outside diameter of the annulus. An annulus can be thick in its axial direction. An annulus can be composed of elements that create attachment points that are planar (or co-planar) without the annulus necessarily occupying all spaces in the volume or plane connecting those points. An annulus can be cup-shaped with one side that is not open or only partially open. An annulus can have a completely open center throughout its entire shape.

In one embodiment, the system and/or method being disclosed comprise an annular wheel. A wheel can be any circular component that is intended to rotate about a central axis. A wheel can comprise a bearing. For purposes of this disclosure and the appended claims, a wheel does not necessarily need to have a bearing or central hub. A wheel can also be a circular component to which an axle, a bearing, or a hub is to be attached. Thus, a wheel can be annular, with a central opening or aperture that facilitates the nesting of components partially or completely inside of one another. A wheel can be monolithic. A wheel can be assembled from multiple components. A wheel can use spokes. The spokes can be in tension. A wheel can be of any other shape or configuration using any other components capable of being understood by anyone skilled in the art.

2. Compact Storage of Multiple Wheels.

Figure 1B:
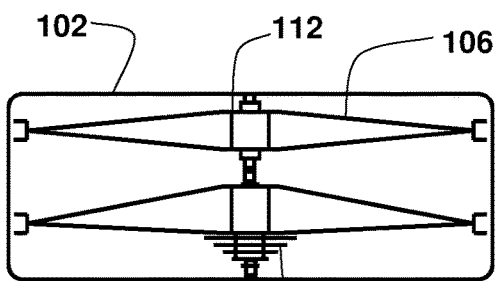
FIG. 1B shows section A-A of FIG. 1A for two prior art spoked 700C bicycle wheels.
Figure 1C:
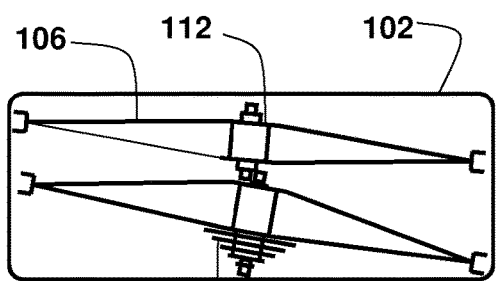
FIG. 1C shows section A-A of FIG. 1A for two prior art spoked 700C bicycle wheels when the wheels are angled slightly to reduce total stack height.
Figure 1D:
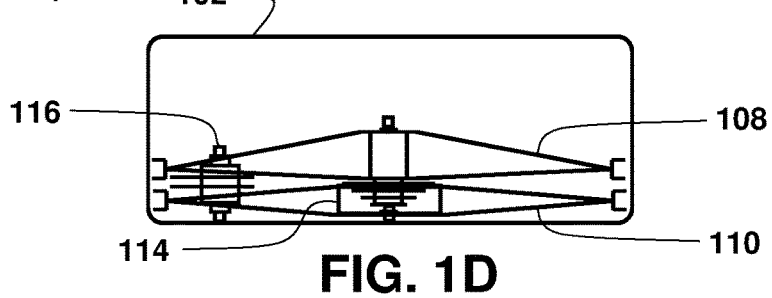
FIG. 1D shows section A-A of FIG. 1A when the prior art spoked 700C front wheel has been replaced with a spoked wheel incorporating a central annulus with an aperture that allows the axle of the rear wheel to nest inside the aperture.
Figure 1E:
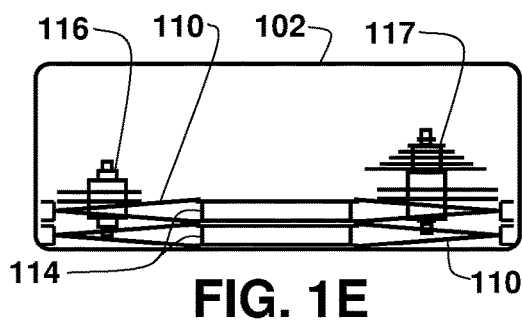
FIG. 1E shows section A-A of FIG. 1A when the prior art spoked 700C front wheel and the prior art spoked 700C rear wheel have both been replaced with spoked wheels incorporating central annuli and removable hubs and both wheels are placed adjacent to one another in a 26×26×10 inch container.
Figure 1F:
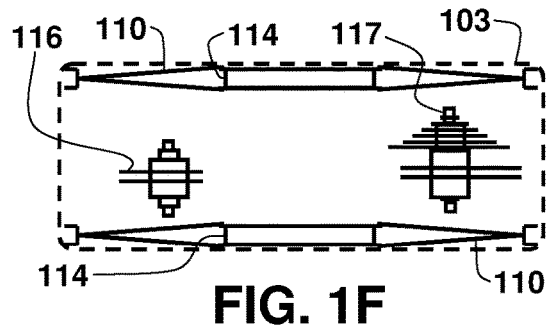
FIG. 1F shows section A-A of FIG. 1A when the prior art spoked 700C front wheel and the prior art spoked 700C rear wheel have both been replaced with spoked wheels incorporating central annuli and removable hubs and both wheels are placed on opposite sides of a 26×26×10 inch volume.

FIG. 1D, FIG. 1E, and FIG. 1F illustrate elements of three configurations and methods that can be employed in embodiments of the present invention. To understand these configurations and methods, it is best to start with the prior art. FIG. 1A shows a top view of one or more bicycle wheels 104 in a container 102. In this example, the bicycle wheels 104 are spoked and have the dimensions of standard 700C or 29-inch wheels. This means that the wheels 104 have rims with an outside diameter of approximately 25.5 inches (648 mm). The container 102 has been sized to meet the airline checked luggage requirement of 62 linear inches (1575 mm). Given the outside diameter of the bicycle rims, the fact that the rims will most likely have tires on them (typically the tires are deflated), and the fact that the container walls will have a thickness that must be within the total dimensions, the minimum length and the minimum width of the container will be approximately 26 inches. Subtracting 26+26=52 inches from the 62 linear inch size limit, the container can have a maximum height of about 10 inches. Therefore, the container shown at 102 in FIGS. 1A, 1B, 1C, 1D, and 1E is 26×26×10 inches. In the prior art, the typical container used for transporting bicycles in this way could be a hard shell plastic suitcase in a clamshell configuration, a soft shell bag, or some configuration of hard and soft components.

FIG. 1B, which is a side view of section A-A of FIG. 1A, illustrates the next issue when trying to pack a bicycle into an airline size container using the systems and methods known in the prior art. Referring to FIG. 1B, a prior art spoked 700C front wheel is shown at 106 and a prior art spoked 700C rear wheel is shown at 108. The standard dropout spacing for a front wheel is 100 mm. The axle typically extends an additional 5 mm per side beyond this 100 mm so the wheel can fit into the front dropouts, making a total axle length of 110 mm (4.3 inches) for a front wheel. The standard dropout spacing for a rear wheel is 130 mm for a road bike, and the rear wheel typically has 5 mm of additional axle length on each side in order to fit into the dropouts for a total axle length of 140 mm (5.5 inches). In FIG. 1B, the two wheels 106 and 108 are axially aligned and the total height of the two stacked wheels is therefore 110 mm+140 mm=250 mm, which is approximately 9.8 inches. Thus, the stack height of the two hubs and the two axles almost exactly takes up the entire interior height of the 10-inch high container 102 once the wall thickness of the container is subtracted from 10 inches. Other bicycle parts (such as the frame, handle bars, pedals, seat, etc) must fit into the remaining space or must be placed into a second piece of luggage, which will cost extra. The remaining space in a container 102 in the prior art systems and methods for packing a bicycle are minimal and broken up into multiple small regions. Tilting the wheels as shown in FIG. 1C does not give much additional space because it is not possible to tilt the wheels to a very great angle and stay within the 26×26×10 inch volume. Thus, many compromises must be made, it takes a lot of time and experimentation to try to get the bike to fit at all, and many people give up on this packing method as a solution. Furthermore, cramming the bike wheels, frame, and components into the container in this way can result in damage as parts rub against each other. To prevent this damage caused by rubbing, each part is typically individually wrapped in a protective material, which requires additional time, space, expense, and weight.

FIG. 1D illustrates a configuration and method that simplifies compact packing of a bicycle of the same size. The container 102 and rear wheel 108 shown in FIG. 1D are the same as the prior art illustrated in FIG. 1A, FIG. 1B, and FIG. 1C. The spoked front wheel, shown at 110 in FIG. 1D, has been modified by replacing the central hub assembly, shown at 112 in FIG. 1B and FIG. 1C with an annulus (or annular module or ring-shaped module), shown at 114 in FIG. 1D, and a user removable hub (or other removable module for connecting the annulus wheel to the rest of the bicycle) shown at 116. The annulus 114 has a concentric central aperture region. This central aperture region of the annulus allows at least part of the thick central hub (and axle) of the rear wheel 108 to nest inside the front wheel 110. As shown in FIG. 1D, the entire space in the container 102 above (or to the side, depending upon how one looks at it) the rear wheel 108 then becomes clear and available for packing other parts of the bicycle. The rear wheel 108 in FIG. 1D sits at the same position in the container 102 as for the prior art (FIG. 1B and FIG. 1C). Thus, the wheel configuration with a removable hub greatly facilitates the packing of a bicycle. The two wheels with the removable hub shown in FIG. 1D represent a simple embodiment of a packable bicycle that fits into 62 linear inches. Advantages of the front wheel embodiment shown in FIG. 1D can include:
  (a) more compact storage of the bicycle (especially if this is a bicycle using full-size wheels);
  (b) potential for storing two bicycles with traditional mountain bike wheels, that are smaller than 700C wheels, into a 62 linear inch size package;
  (c) improved potential (due to having more space) for rigidly (i.e. immovably and securely) attaching bicycle parts together to eliminate the need for wrapping each bicycle part prior to packing; and
  (d) more room for the other bicycle components allows for more soft padding on the outside of the packed bicycle, which makes it easier to eliminate the weight, cost, and transportation of a hard-shell suitcase.

The two wheels illustrated in FIG. 1D do not necessarily need to be a front wheel with a central annulus 110, a removable hub 116, and a rear wheel with a non-removable hub 108. The rear wheel could have a removable hub. The front wheel could have a fixed hub. The two wheels could be two front wheels. The two wheels could be two rear wheels. The two wheels could be two wheels from a vehicle that has more than two wheels. The two wheels could be for two different vehicles. The two wheels could both have removable hubs. One or both of the two wheels could have removable centers that are not hubs, they could be removable axle assemblies, for example, with the bearings being in the front wheels and the central annulus being inside the races of the bearings. To illustrate examples of embodiments, FIG. 1E and FIG. 1F show a configuration in which both the front wheel and the rear wheels 110 both comprise an annulus 114 with detachable hubs, 116 and 117. The user-detachable front hub is shown at 116 and the user-detachable rear hub is shown at 117. This front hub 116 and rear hub 117 could be placed anywhere in the space available, such as embedded partially in the spoked wheels, as shown in FIG. 1E or completely in the volume reserved for the bicycle frame, as shown in FIG. 1F. This flexibility in where the two hubs 116 and 117 are placed helps to maximize the efficiency of using the available space.

In the configuration shown in FIG. 1E, the two wheels with central annuli 110 are adjacent to each other in the 26×26×10 inch container, 102. In the configuration of FIG. 1F, the two wheels 110 are on opposite sides of a flexible 26×26×10 inch bag 103. Placement of the two annular spoked wheels 110 in the configuration shown in FIG. 1F can have the following advantages:
  (a) any small protrusions of the bike frame components can extend through the spoke region of the wheels 110 and the entire packed bicycle can still fit within the overall 10-inch height;
  (b) the sides of the annular spoked wheels 110 can be part of the protective structure for the packed bicycle on the 26×26 inch top and bottom surfaces of the volume as shown;
  (c) the rims (typically with rubber tires on them) can protect the 26×10 inch front, rear, right side, and left side surfaces of the volume as shown in FIG. 1F; and
  (d) by using the wheels as part of the protective structure, the storage device 103 can be have fewer or no rigid (or hard) components, such as the flexible 26×26×10 inch bag, shown at 103. A storage device 103 with few or no hard components will also pack more easily when not needed to store the packed wheels and other bicycle components.

3. Wheel with Central Annulus

Figure 2:
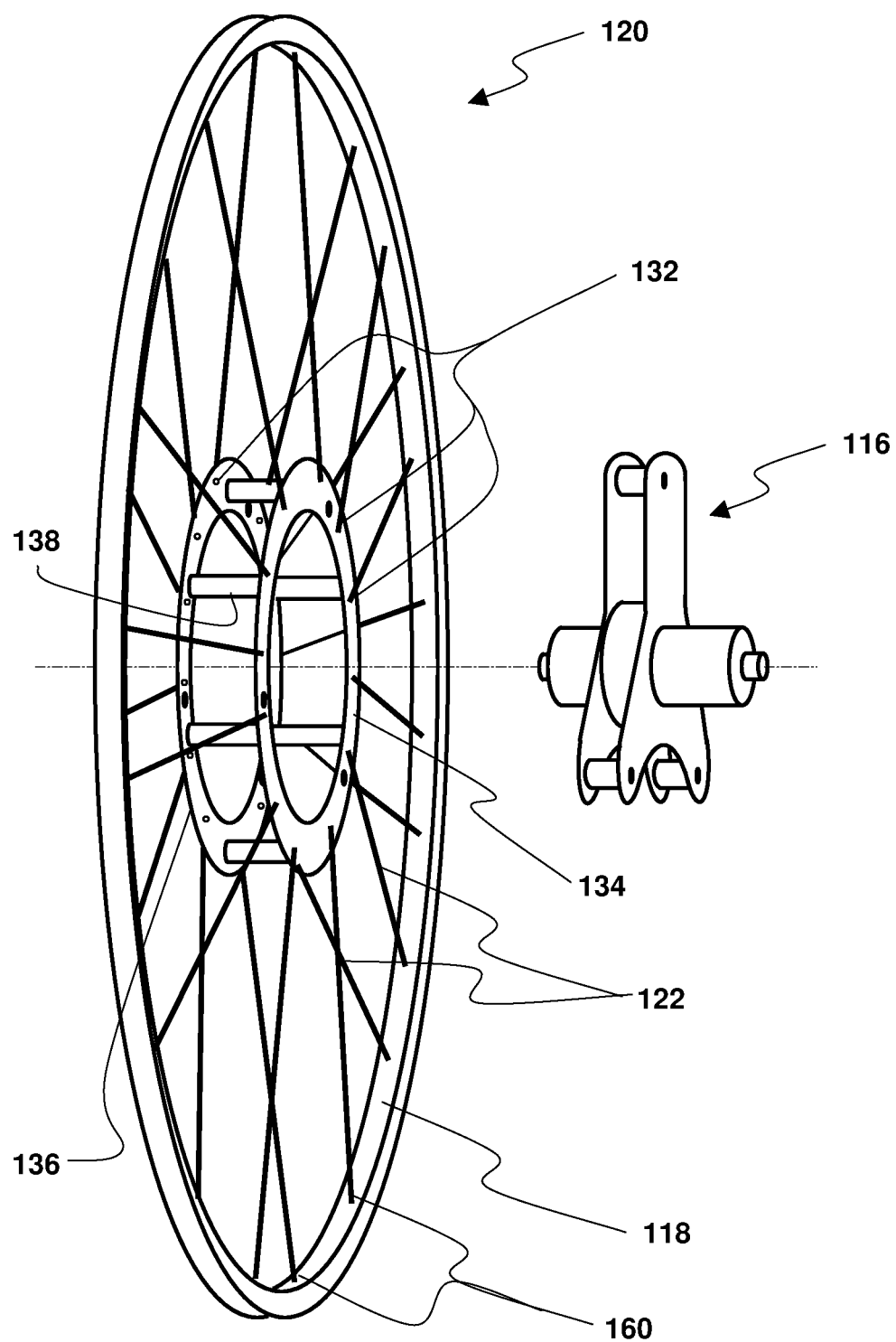
FIG. 2 shows a perspective view of a spoked bicycle wheel with central annulus and user detachable hub.

FIG. 2 shows a perspective view of a spoked wheel 120, and a user detachable hub 116 (which could also be called a front removable module). The wheel 120 and hub 116 can be used to facilitate the packing of a bicycle, as was shown and described with reference to FIG. 1D, FIG. 1E, and FIG. 1F. The spoked wheel 120 can be of any size and shape capable of being understood by anyone skilled in the art. Common human powerable vehicle spoked wheel sizes can include 700C/29 inch, 65B/27.5 inch, 26 inch, 24 inch, 20 inch, and 16 inch as were described earlier in this disclosure. The spoked wheel 120 comprises a rim, shown at 118, an inner annulus (or inner annular module or ring-shaped module), and a plurality of spokes, shown at 122 that radiate outwards from the inner annulus to connect the annulus to the rim. The rim 118 is circular and is located concentrically to the central axis of the wheel 120. It should be noted that the rim could be of any other size capable of being understood by anyone skilled in the art. The rim used on a wheel of a human-powerable vehicle can be made of any material capable of being understood by anyone skilled in the art. Examples of rim materials include aluminum, steel, titanium, wood (such as birch, spruce, oak, etc), carbon fiber reinforced composite, glass fiber reinforced composite, glass, and plastic. The rims can be fabricated using any process capable of being understood by anyone skilled in the art including the use of extrusion, machining, casting, molding, bending, stamping, autoclaving, heating, vacuum forming, and injection molding.

The spoked wheel 120 shown in FIG. 2 has 24 spokes. Other common spoke counts can include 3, 4, 5, 6, 8, 10, 12, 16, 18, 20, 24, 28, 32, 36, 40, 48, 72, 96, and 144 spokes. The spoke count can be any quantity capable of being understood by anyone skilled in the art. The inner annulus includes annulus spoke attachment points, shown at 132, for spokes that radiate outwards from the inner annulus. In the embodiment shown, the annulus spoke attachment points 132 are in a circular configuration on two offset parallel planes separated by spacers. In the embodiment shown, the spacers comprise a plurality of threaded tubular elements, having internal threads, which will be further detailed with reference to FIG. 3A and FIG. 3B. The circular configuration of the annulus spoke attachment points 132 is concentric to the center of the wheel 120. In the embodiment shown, the annulus spoke attachment points 132 are axial through holes. In the embodiment shown, the two offset (non coplanar) parallel planes are in the form of two annular (or ring shaped) disks, 124 (first annular disk) and 126 (second annular disk), and are separated by annular disk spacers, shown at 128. These annular disks 124 and 126 could also be called rings or annuli. In the embodiment shown, the annular disks, 124 and 126, are located concentrically to the central axis of the wheel. In the embodiment shown, the spokes are configured to be in tension. In the embodiment shown, the spokes are configured in a generally triangular configuration if the wheel was looked at in a section view, with the two planes of annulus spoke attachment points 132 being offset. The spokes 122 are connected to the rim 118 at rim spoke attachment points, shown at 160. In the embodiment shown, the rim spoke attachment points 160 are in a common plane, in a circular configuration concentric to the axis of the wheel. The resulting configuration of the spokes 122 can also be described as two cones having their apex in the center of rotation of the wheel. It is also possible for the rim spoke attachment points 160 to be located in multiple offset parallel planes. For example, it is possible to attach the spokes from the first annular disk 124 to a plane on the rim that is offset and parallel to the plane on the rim where the spokes from the second annular disk 126 are attached. In the embodiment shown, the attachment points for the spokes 122 on the rim 118 are in the form or radial through holes in the rim 118. The placement of the spokes 122 from the annulus spoke attachment points 132 to the rim 118 can be in any configuration capable of being understood by anyone skilled in the art. The type of spokes 122 used can be any type of spoke 122 capable of being understood by anyone skilled in the art. A typical example is spokes 122 having shafts that comprise stainless steel (an alloy of iron, nickel, and other materials) and nipples (used to tension the spokes by rotation) that comprise brass.

Further referring to FIG. 2, the embodiment of the user detachable hub shown at 116 has three fingers that extend radially. The three fingers comprise hub attachment points. The user detachable hub 116 can be attached to the wheel 120 by a user without affecting spoke tension as will be described in the sections that follow.

Figure 3A:
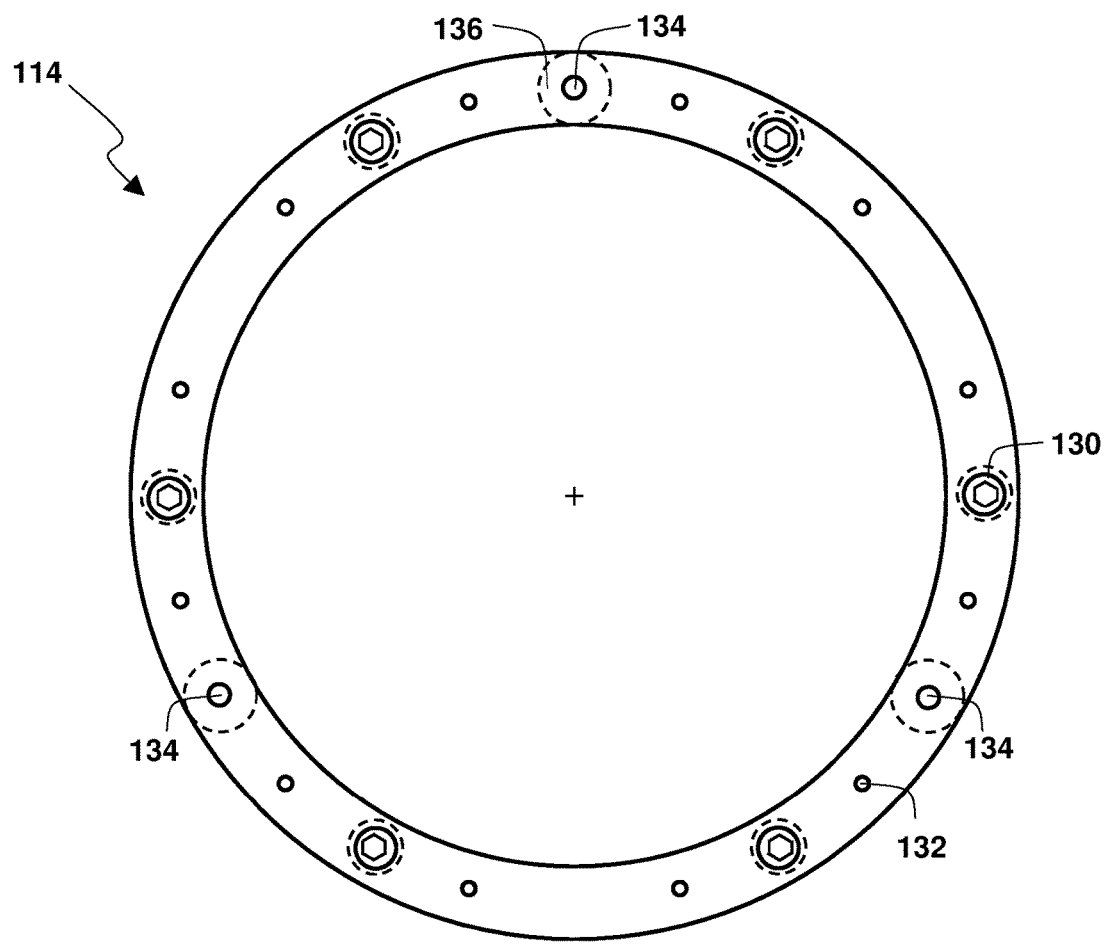
FIG. 3A shows an end view of an annulus suitable for use as part of a spoked wheel.
Figure 3B:
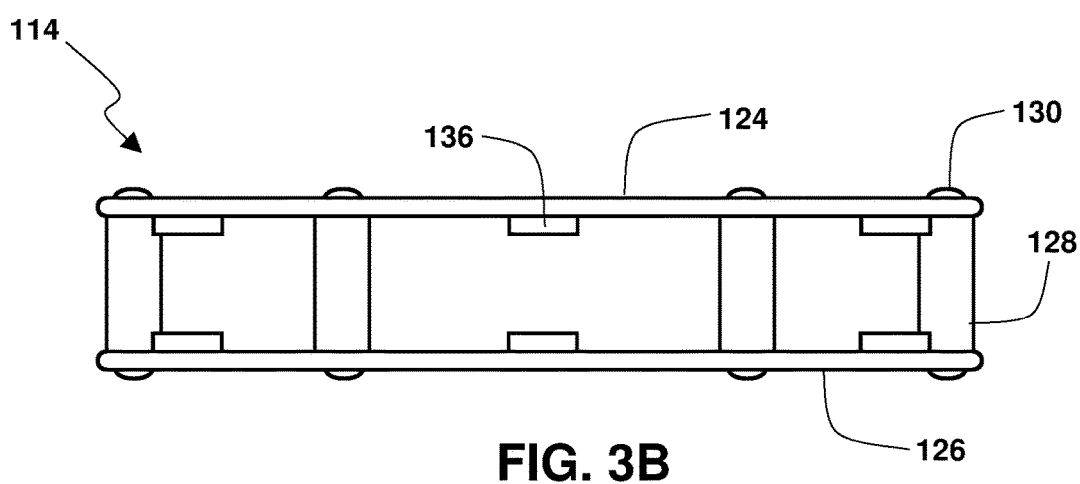
FIG. 3B shows a side view of the annulus of FIG. 3A.

FIG. 3A and FIG. 3B provide further detail of an embodiment of an annulus. FIG. 3A is an axial view. FIG. 3B is a side view of an annulus, with the annulus being shown at 114. The annulus 114 can also be called an inner annulus, an inner annular module, or a ring-shaped module. The annulus 114 shown in this embodiment comprises two parallel annular disks, shown at 124 and 126, separated by six disk spacers, shown at 128. The disk spacers 128 are attached to the annular disks, 124 and 126, by disk-spacer assembly bolts, shown at 130 that engage threads in the disk spacers 128. The annular disks, 124 and 126, comprise annulus spoke attachment points, shown at 132. The annulus spoke attachment points 132 are configured for spokes that will radiate outward from the annulus 114. The annulus spoke attachment points 132 are in a circular configuration. In the embodiment shown, the annulus spoke attachment points 132 are axial thru holes designed for spokes with j-bends. The annulus spoke attachment points 132 can be any type of attachment point capable of being understood by anyone skilled in the art including radial through holes. The embodiment of the annulus 114 shown has 12 spoke attachment points per disk, for a total of 24 annulus spoke attachment points 132. There can be any number of annulus spoke attachment points 132 per annular disk above a minimum of 2 and the number of annulus spoke attachment points 132 does not need to be the same for both annular disks. The annulus 114 also includes three hub attachment points shown at 134. In the embodiment shown, the annulus 114 is designed for fingers in the hub to extend within the annulus 114 and the fingers in the hub are intended to be placed between hub attachment bosses, shown at 136 and attached using hub-annulus attachment bolts, shown at 150 in FIG. 5 and FIG. 6A. In the embodiment shown, there are six hub attachment bosses 136, one on each side of each of the three fingers.

As mentioned previously, one important benefit of having an annulus is that the center of the wheel is open. This provides the opportunity for part of a second wheel to nest inside of this annulus to reduce overall stack height for multiple wheels. An analysis of various wheels and hubs has identified the following diameters as being typical for the centers of wheels that one might want to nest inside the annulus:

| Diameter of a hub in various locations | Typical size |
| --- | --- |
| Outside diameter on non-flange side for a rear wheel that does not have disk brakes taken 1 inch from end of axle | 1 inch (25 mm) |
| Outside diameter of a disk brake flange | 2 inches (50 mm) |
| Outside diameter of an 18-tooth cog | 4 inches (100 mm) |
| Outside diameter of a 36-tooth cog | 6 inches (150 mm) |
| Outside diameter of a 42-tooth cog | 7 inches (175 mm) |
| Outside diameter of a 48-tooth cog | 8 inches (200 mm) |
| Outside diameter of a disk brake | 8 inches (200 mm) |

Given the information above, it is beneficial to have the aperture of the annulus be as large as possible, and 1 inch (25 mm), 2 inches (50 mm), 4 inches (100 mm), 6 inches (150 mm), 7 inches (175 mm), and 8 inches (200 mm) are good targets to shoot for.

Figure 4A:
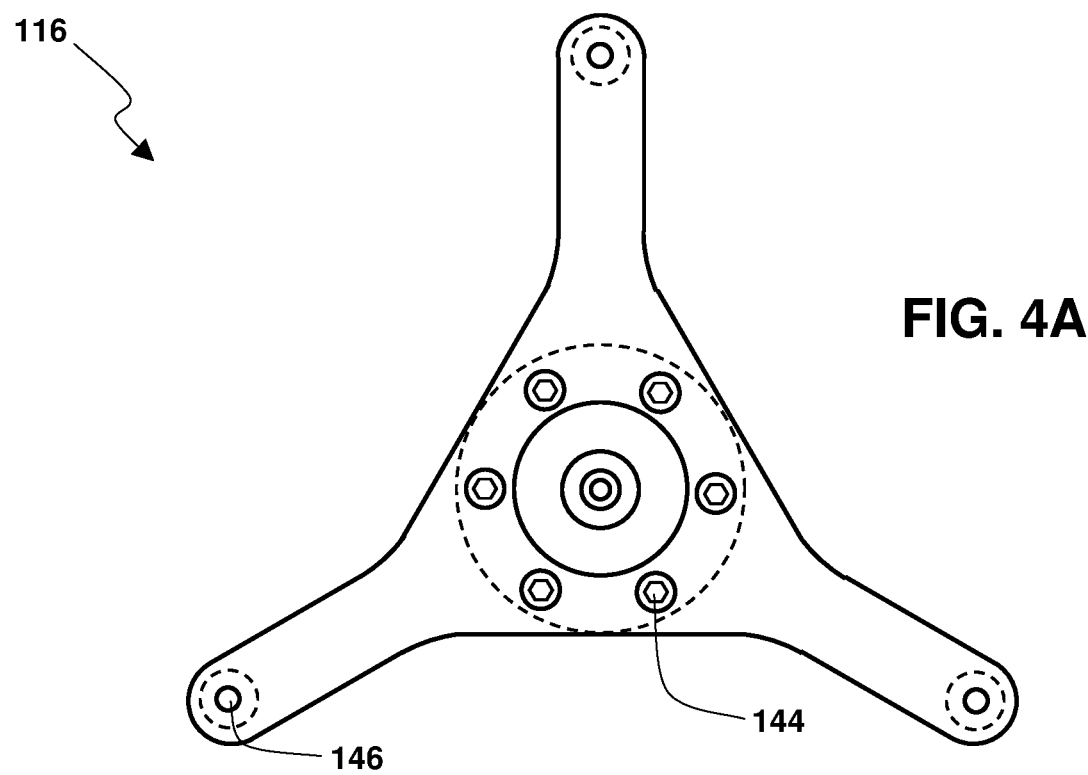
FIG. 4A shows an end view of a removable hub suitable for use with the annulus of FIG. 3A and FIG. 3B.
Figure 4B:
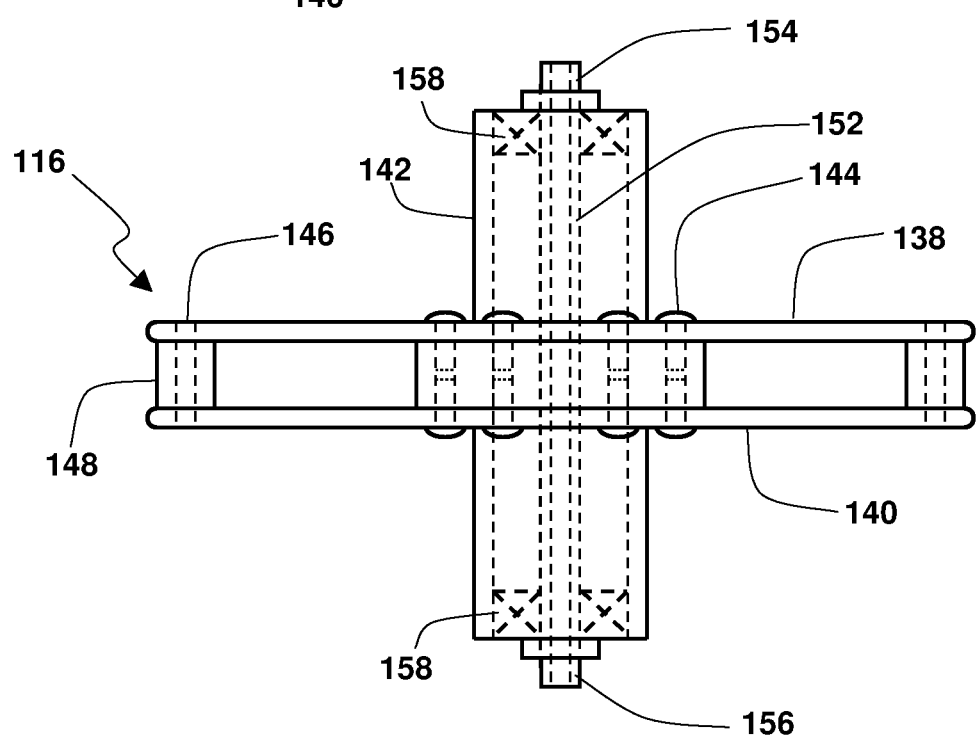
FIG. 4B shows a side view of the removable hub of FIG. 4A.

FIG. 4A and FIG. 4B provide detail of an embodiment of a user detachable hub at 116. The detachable hub 116 comprises two flat spiders, shown at 138 and 140 that are attached to a hub body, shown at 142, using spider attachment bolts, shown at 144. Each spider has three fingers that extend outwards to annulus attachment points, shown at 146. There are three finger spacers, shown at 148, which ensure that the fingers are in the correct positions and can be compressed when placed into the annulus 114. The detachable hub also comprises a central axle, shown at 152. The central axle 152 has two frame attachment regions, one on each end, shown at 154 and 156. These frame attachment regions, 154 and 156, will fit into the dropouts on a bicycle frame. If this is a hub for a front wheel, the frame attachment regions, 154 and 156 will fit into the dropouts on the front fork of the bicycle frame. If this is a hub for a rear wheel, the frame attachment regions will fit into the dropouts on the rear triangle of the frame, which are typically either part of the chain stays, the seat stays, or of an integrated rear triangle that comprises both seat stays and chain stays. The detachable hub 116 also comprises bearings (typically 2 sets), shown at 158, which are typically inside the hub body and allow the hub body 142 to rotate about the axle. The remaining parts and configuration possibilities of the detachable hub can be similar to other bicycle hubs and capable of being understood by anyone skilled in the art. For example, the central axle 152 shown is a hollow cylinder that is designed for attachment to a bicycle frame using a skewer. The bearings shown are cartridge bearings, but open unsealed bearings could also be used.

Figure 5:
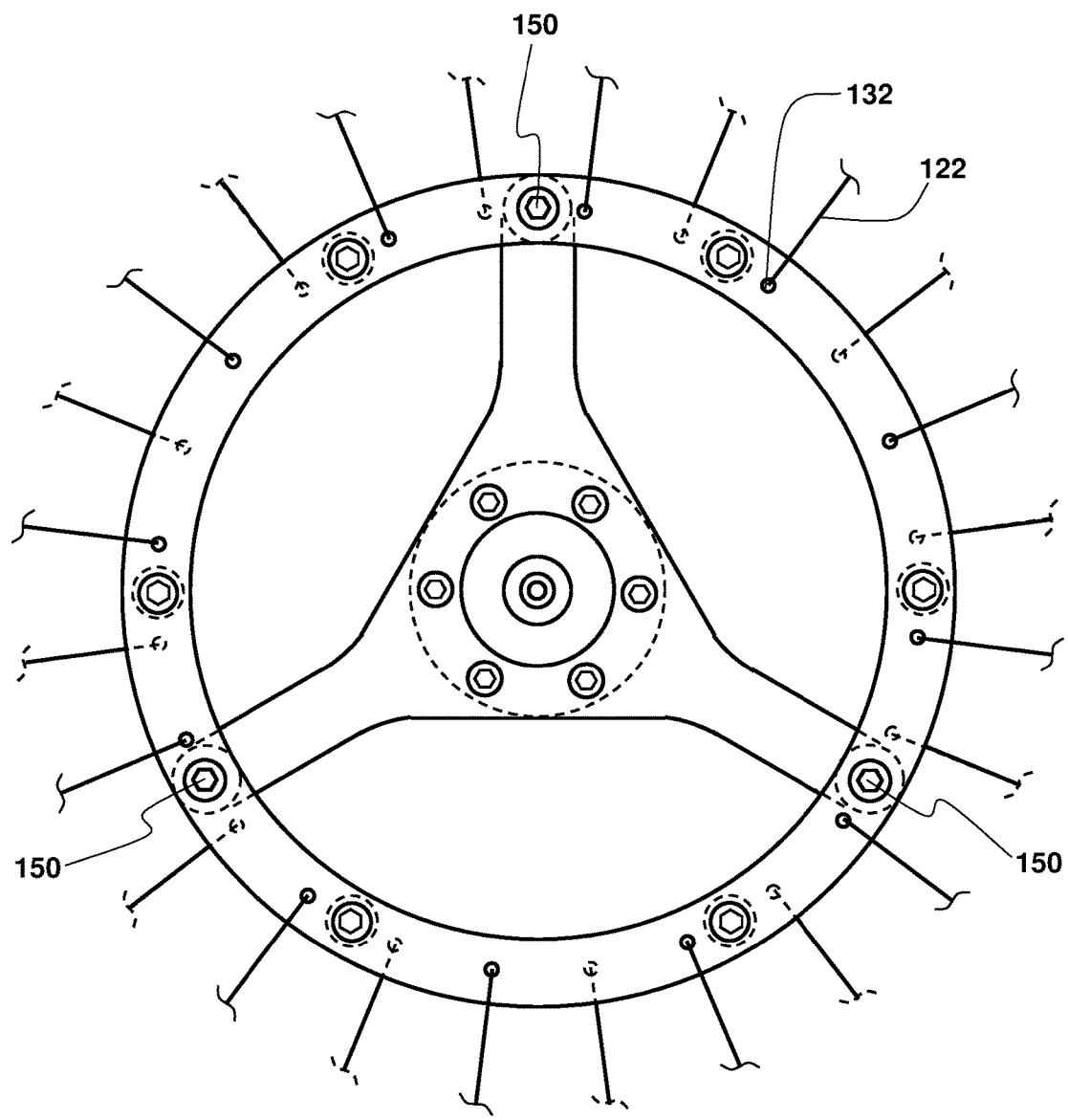
FIG. 5 shows an end view of the removable hub of FIG. 4A assembled into a spoked version of the annulus of FIG. 3A.
Figure 6:
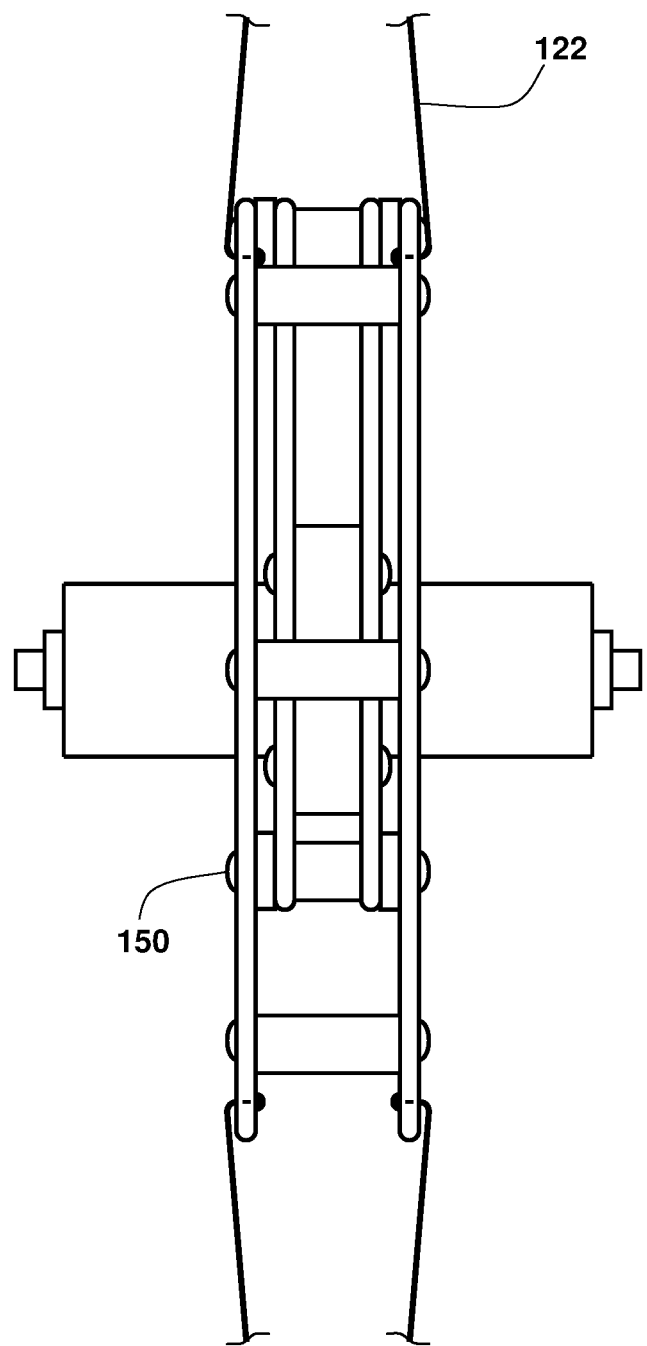
FIG. 6 shows a side view of the assembly of FIG. 5.

FIG. 5 and FIG. 6 show the removable hub assembled into the annulus. In addition, FIG. 5 shows how the spokes radiate out from the annulus spoke attachment points 132.

Figure 7A:
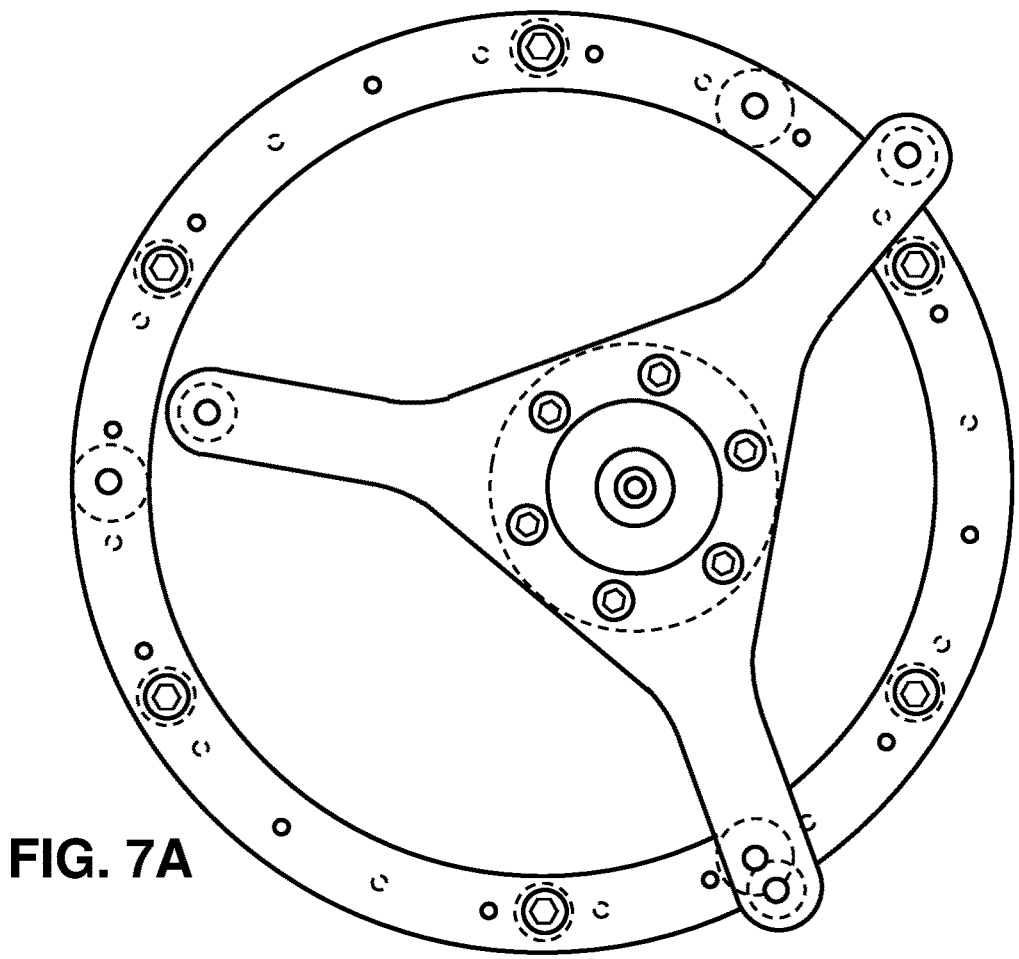
FIG. 7A shows an end view of how the removable hub of FIG. 4A and FIG. 4B can be placed inside the annulus shown in FIG. 3A and FIG. 3B.
Figure 7B:
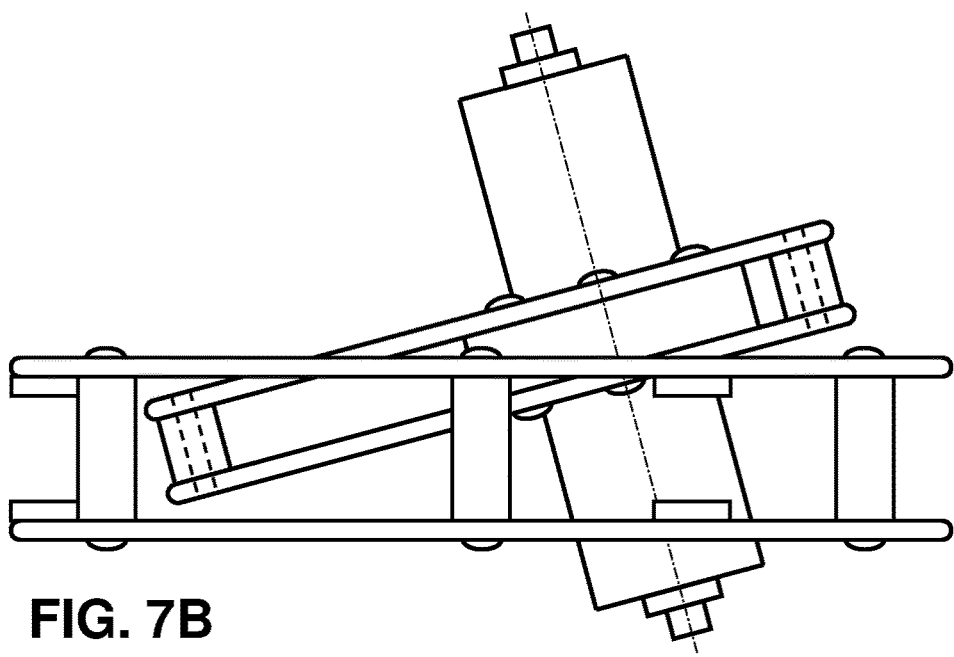
FIG. 7B shows a side view of how the removable hub of FIG. 4A and FIG. 4B can be placed inside the annulus shown in FIGS. 3A and 3B.

FIG. 7A and FIG. 7B show how a hub (having fingers extending to a diameter greater than the inside diameter of the annulus) can be placed inside the annulus. The process involves selectively tilting the hub, placing one finger in the annulus and then sliding the hub to a position where the next finger can be inserted, until all three fingers are inserted and the detachable hub can be rotated so each of the three fingers is in position between the finger spacers.

4. Alternate Annular Wheel Embodiments

Figure 8:
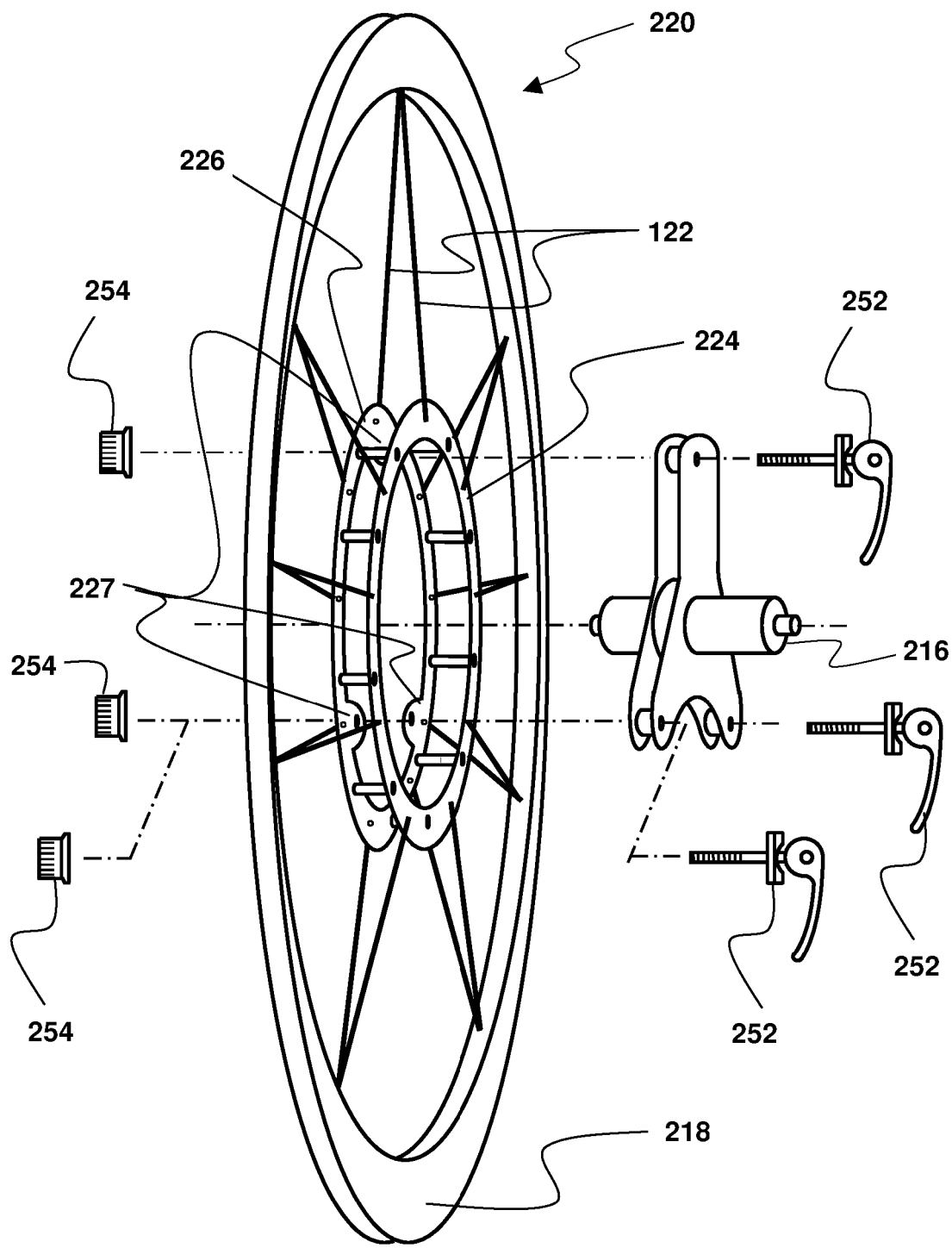
FIG. 8 shows a perspective view of an alternate embodiment spoked bicycle wheel with central annulus and user detachable hub.

FIG. 8. shows an alternate embodiment of the assembly that was shown in FIG. 2. This alternate assembly comprises an alternate spoked wheel, shown at 220, an alternate user detachable hub, shown at 216, and three eccentric cam quick release devices, comprising eccentric cam quick release mechanisms, shown at 252, and hand tightenable nuts, shown at 254. The differences between the embodiment shown in FIG. 8 and the embodiment shown in FIG. 2 include the following:

(a) The spoked wheel, 120 in FIG. 2, has 14 spokes and the alternate spoked wheel 220 has 18 spokes, shown at 122;

(b) Pairs of spokes 122 on the alternate spoked wheel 220 originate at aligned points on the two alternate annular disks (which can also be called rings) 224 and 226 and terminate close to each other on the alternate rim 218;

(c) Three mounting tabs 227 allow the alternate user detachable hub 216 to be installed into the two alternate annular disks 224 and 226 in a direct axial fashion without needing to tilt and rotate the hub as was illustrated in FIG. 7A and FIG. 7B;

(d) The alternate hub 216 is secured into the alternate annulus assembly through the use of eccentric cam quick release mechanisms 252 and hand tightenable nuts 254 that do not require the use of any tools for installation and removal of the alternate hub 216;

(e) The two alternate annular disks 224 and 226 have a larger diameter than the annulus assembly in FIG. 2, which means that the spoke attachment points are at a larger diameter, and means that the disk spacers 128 can be shorter resulting in the two alternate annular disks being closer together, which reduces the maximum thickness of the wheel to aid in packing the wheels and bike; and (f) The alternate rim 218 has a deep profile which improves the stiffness of the rim allowing for a lower spoke count, wider spoke spacing, and a smaller effective rim diameter (ERD or diameter of the spoke attachment points on the rim), which further decreases the spacing of the alternate annular disks 224 and 226 for the same spoke angle.

Figure 9A:
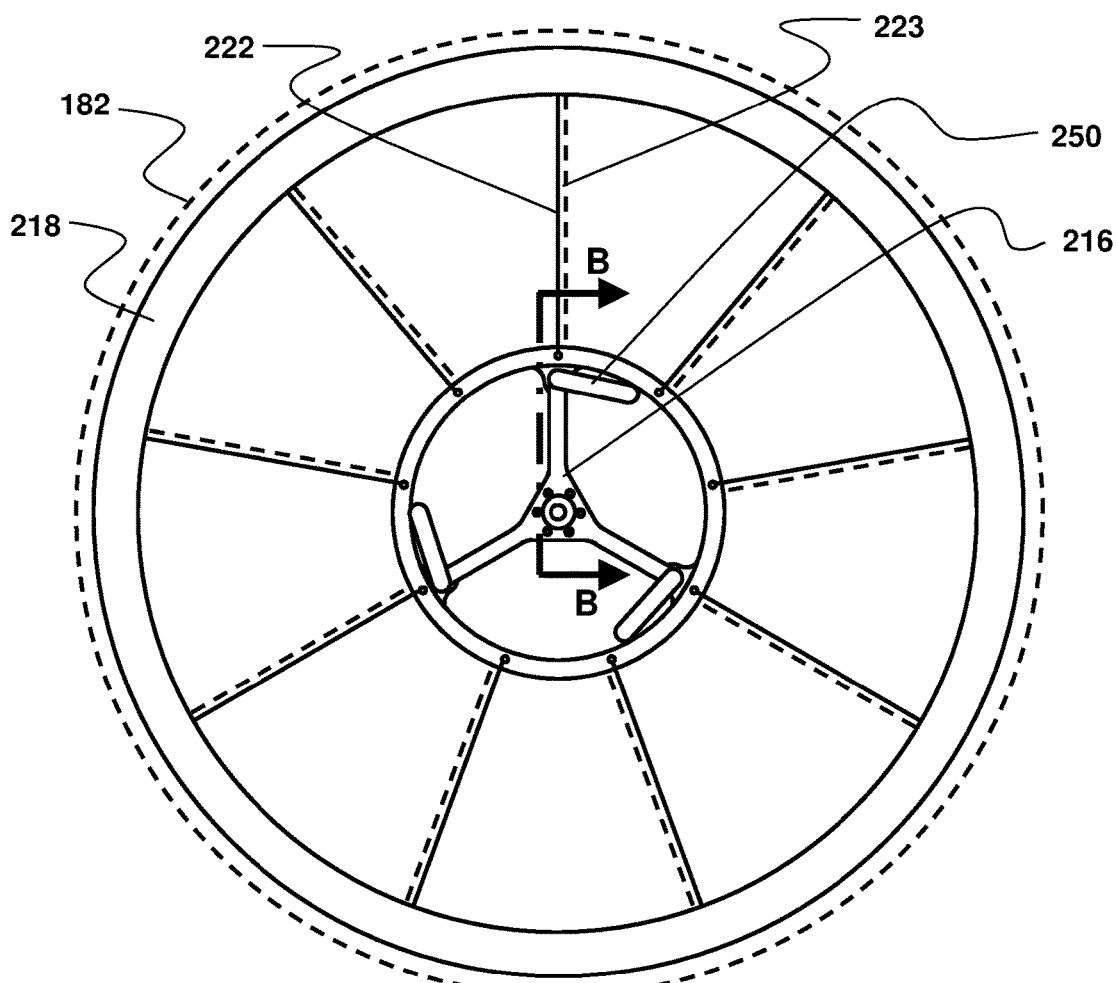
FIG. 9A shows an axial view of the wheel of FIG. 8.
Figure 9B:
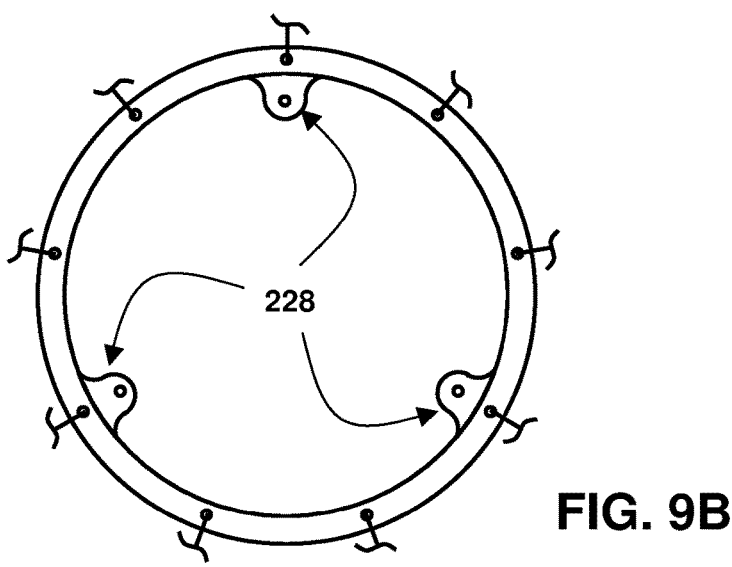
FIG. 9B shows an axial view of the central section of the wheel of 9A with the hub removed.
Figure 10:
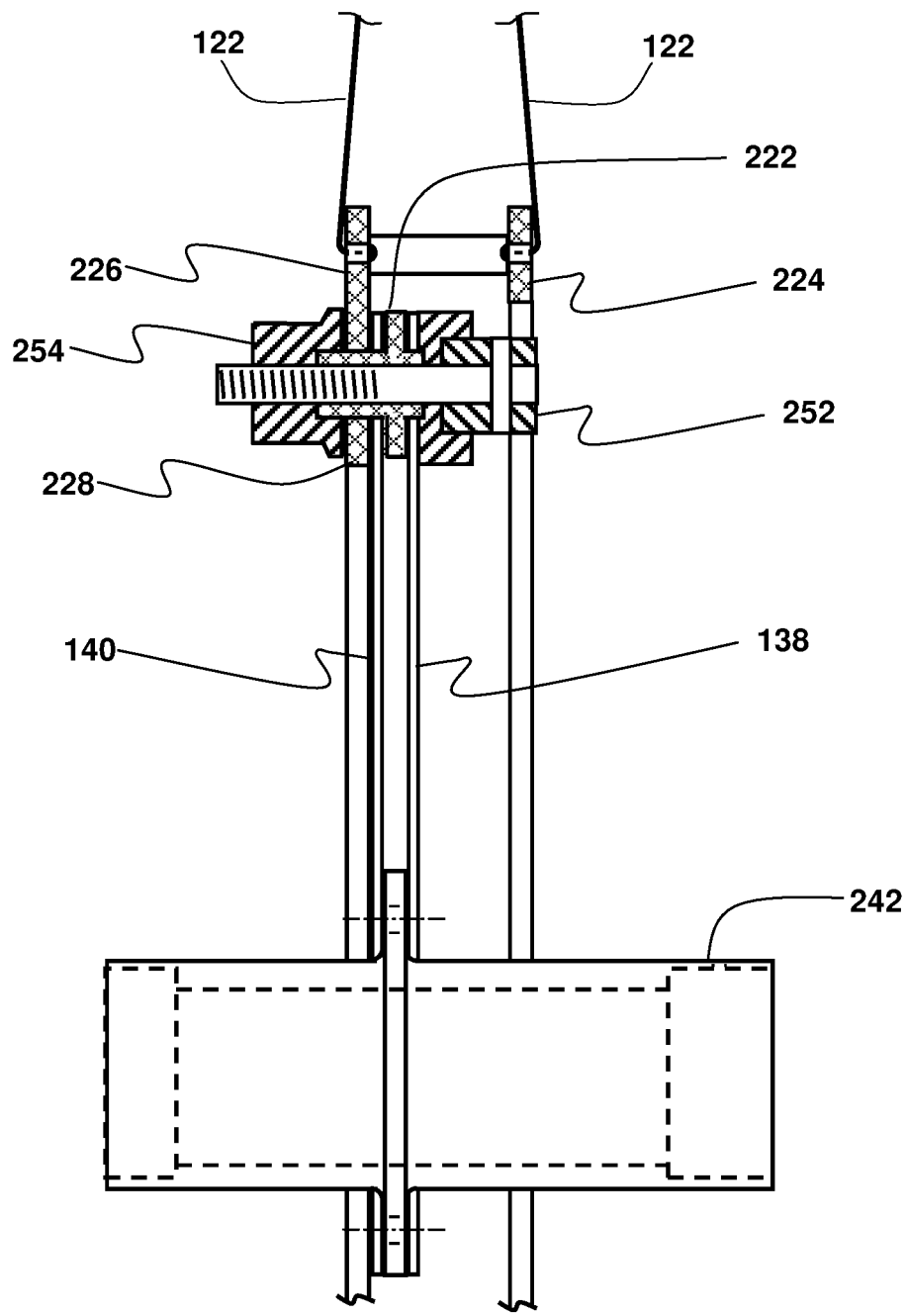
FIG. 10 shows section B-B of FIG. 9.

FIG. 9A shows an axial view of the wheel of FIG. 8 and FIG. 9B shows an axial view of the central section of this wheel with the alternate hub 216 and quick release devices 250 removed. A tire is shown as a dotted line at 182. The alternate rim is shown at 218. For clarity, the near spokes 222 coming from the closest (front) alternate annular disk (224 in FIG. 8) are shown as solid lines and the far spokes 223 coming from the second alternate furthers (rear) disk (226 in FIG. 8) are shown as dotted lines. The hub mounting tabs are shown at 228 in FIG. 9B and are located on the rear disk FIG. 10 shows section B-B of FIG. 9A; including an alternate hub body 242, a first flat spider 138, a second flat spider 140, the alternate first disk 224, the alternate second disk 226 that includes the hub mounting tab 228, the eccentric quick release mechanism 252, the hand tightenable nut 254, and two spokes 122. Also shown is an attachment bushing 256 that can be used to secure the alternate first disk and the alternate second disk to each other and provide a hollow shaft that fits into the hub mounting tab 228.

Figures 11A, 11B, 11C:
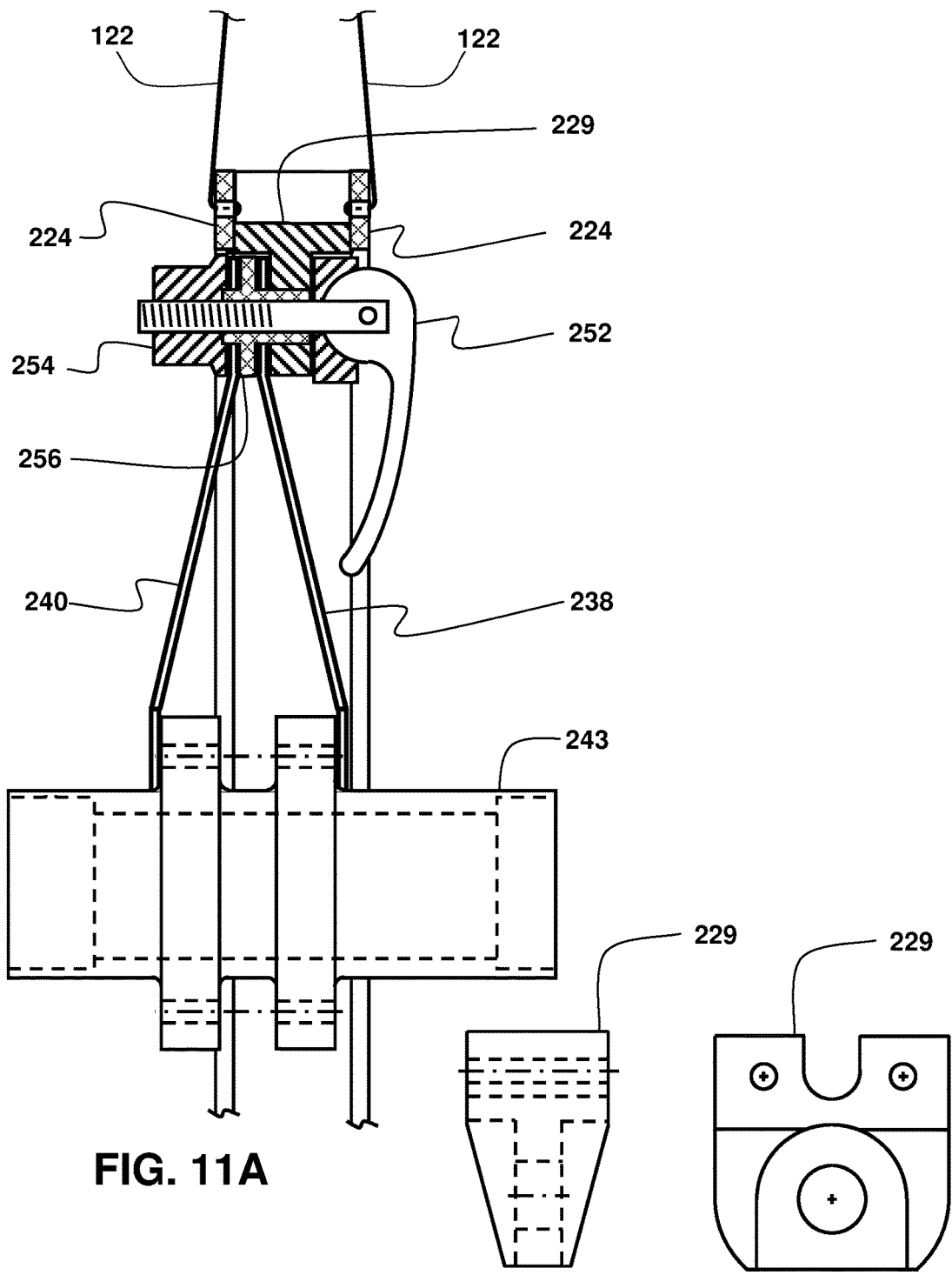
FIG. 11A shows an alternate embodiment of a spider and annulus attachment system that can be substituted for the system shown in FIG. 10.
FIG. 11B shows a first view of the mounting block that can be used with the embodiment in FIG. 11A.
FIG. 11C shows a second view of the mounting block of FIG. 11B.

FIG. 11 shows another alternate embodiment of a spider and annulus attachment system that can be substituted for the alternate system shown in FIG. 10 and the system that was shown in FIG. 2, FIG. 4A, FIG. 4B, FIG. 5, FIG. 6, FIG. 7A and FIG. 7B. In FIG. 11, the spokes are shown at 122, the eccentric quick release mechanism is turned 90 degrees and is shown at 252. The hand tightenable nut is shown at 254. The two disks 224 are identical and have no mounting tabs. Instead, a hub mounting block 229 spaces the disks 224 and provides an attachment point for the spiders. In the embodiment shown in FIG. 11, the first spider 238 and second spider 240 are further apart at the point where they are attached to the other hub body 243 than they are at the point where they are attached at the rings 224 through the hub mounting block 229. By having the rings be closer together at the point where the spiders attach, the number of spacers needed is reduced and the overall structure for the wheel can be made flatter. Using spiders that have a triangular configuration allows the spiders to be made of substantially thinner material and yet the overall structure provides high axial stiffness because the angled beams in the spiders would need to change in length for the rings to move axially relative to the hub. Further referring to FIG. 11A, the spiders, 238 and 240, can be bolted to flanges on the hub shell 243, which has the remaining hub components such as bearings mounted in it. At their distal points, each pair of fingers of a spider is separated and held by the attachment bushing 256. The attachment bushings 256 mount into the hub mounting blocks 229, that are shown in FIG. 11B and FIG. 11C, and can be clamped in the hub mounting blocks 229 using hand-actuated cam fasteners that each comprise an eccentric cam quick release device 252 and hand tightenable nut 254. The rings 224 can be spaced apart and held in this spacing by the hub mounting blocks 229. There can also be ring (or annular disk) spacers (such as those shown at 128 in FIG. 3B) to separate the two rings 224. The attachment bushing 256 was shown with reference to FIG. 10. This attachment bushing(s) 256 can serve the following purposes. (1) The bushing(s) can be made of a hard material, such as steel that better facilitates the transmission of force from the narrow spiders to the rings. (2) The bushing(s) can have flanges that space the spiders apart. When the both spiders are on the same side of the location where they are attached to the rings (either the mounting tabs in FIG. 9B and FIG. 10 or the mounting block in FIG. 11) the packing and unpacking of the human-powered vehicle is simplified because the hub+spiders can be loaded axially directly into the rings 224. This eliminates the complex motions needed to assemble the configuration that were shown in FIG. 7A and FIG. 7B.

The rings 224 that have been illustrated could simply be cut from sheet metal (such as 1/8" thick flat 6061-T3 aluminum plate) and this cutting operation could be performed using a water jet, laser cutter, plasma cutter, hole saw, milling machine, or lathe using techniques capable of being understood by anyone skilled in the art. The rings 224 could be anodized after they have been made to size.

It should be noted that embodiments of the wheels used with the present invention can comprise any combination or set of permutations of the elements and features illustrated and/or described in this disclosure, including, but not limited to:

a configuration of the annulus in which straight spokes instead of j-bend spokes are used and therefore the inner attachment points of the spokes are through holes in a hollow cylinder located on two parallel planes that are perpendicular to the central axis of the wheel;

the annulus can have an orientation feature that visually or physically helps the user to identify the correct orientation of the annulus relative to the detachable hub when the annulus and the detachable hub are to be attached to each other (orientation in this disclosure means which end of the axle of the hub is most proximate to which of the parallel annular disks);

the annulus can have a rotation feature that visually or physically helps the user to identify the correct rotation of the annulus to the detachable hub when the annulus and the detachable hub are to be attached to each other (orientation in this disclosure means rotation of the annulus relative to the hub about their common central axis);

the detachable hub can have an orientation feature that visually or physically helps the user to identify the correct orientation of the detachable hub relative to the annulus when the detachable hub and the annulus are to be attached to each other;

the detachable hub can have a rotation feature that visually or physically helps the user to identify the correct rotation of the detachable hub relative to the annulus when the detachable hub and the annulus are to be attached to each other;

an attachment system between the annulus and the removable hub that comprises a snap attachment element whereby a cyclist can detach and reattach a hub without the use of tools; and/or a wheel configuration that has no central hub. Instead, there could be a ring shaped inner annulus (to which the spokes are attached) that further comprises one or more bearings that have a large central opening. One race of this bearing or bearings could be attached to the annulus. The other race could be attached to a ring-shaped element that does not rotate when the wheel rotates and this ring-shaped element could be attached to one arm of a front "fork" that then attaches to the rest of the bike frame in a way that is very similar to the "Lefty" fork made by Cannondale. Thus, the wheel and fork would always have a large diameter aperture that allows a real wheel to nest inside of the center of a front wheel.

5. Spoke Lacing Patterns.

Figure 12A:
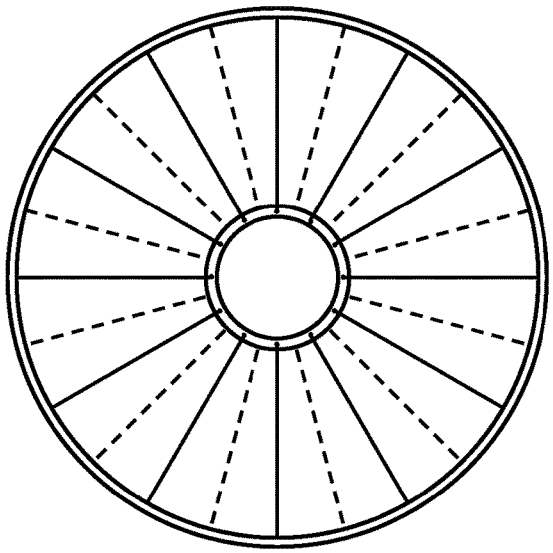
FIG. 12A shows radial spoking between an annulus and a rim.
Figure 12B:
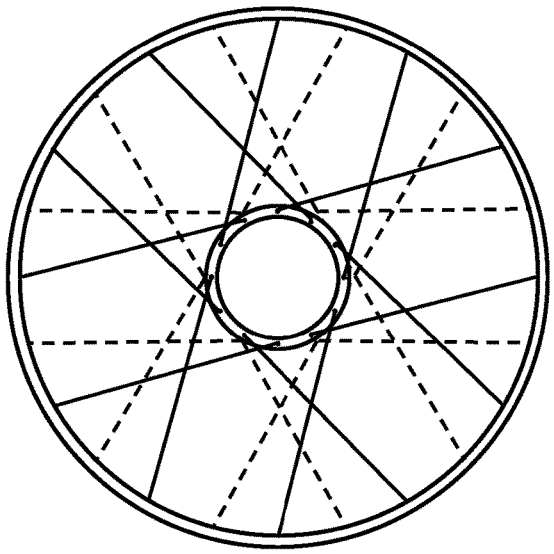
FIG. 12B shows tangential spoking between an annulus and a rim.
Figure 12C:
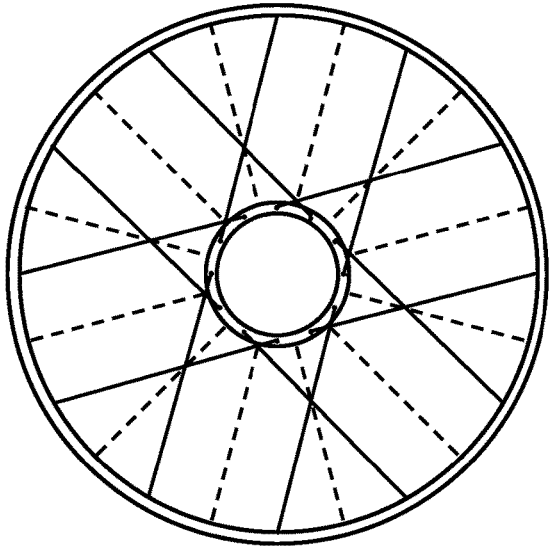
FIG. 12C shows a combination of radial and tangential spoking between an annulus and a rim.

FIG. 12A, FIG. 12B, and FIG. 12C show examples of spoke lacing patterns that can be used with embodiments of the present invention. For ease of understanding the spokes that reach the near plane of the annulus for these wheels are shown as solid lines and the spokes that reach the far plane of the annulus are shown as dotted lines. FIG. 12A shows an embodiment in which both the near plane and the far plane spokes are laced radially. FIG. 12B shows an embodiment in which both the near plane and the far plane spokes are laced tangentially. FIG. 12C shows an embodiment in which the spokes in the two planes are laced differently from each other. In the configuration show in FIG. 12C, the near plane spokes are tangentially laced and the far plane spokes are radially laced. There can be advantages and disadvantages to each of the types of spoke lacing patterns shown in FIG. 12A, FIG. 12B, and FIG. 12C. For example, the radial-radial pattern shown in FIG. 12A is often used for front wheels on bicycles with rim brakes because these wheels transmit no tangential force and this configuration maximizes the radial and axial loads that can be carried. Rear wheels are used to drive the bike forward and therefore must transmit torque (i.e. tangential force) from the hub to the rim and the tires, so a tangential-tangential spoke pattern such as that shown in FIG. 12B is most often used. A mixed tangential-radial pattern, such as that shown in FIG. 12C can be beneficial in some situations.

7. Foldable Compact Bicycle and Bicycle Frame Embodiments.

Prior art bicycles designed for compact storage and transport generally fall into the following non-exclusive categories:

GROUP A comprises bicycles such as the embodiments shown in U.S. Pat. No. 4,426,606 (Hon) and U.S. Pat. No. 5,975,551 (Montague) that (1) have a single fold about a substantially vertical axis at a point located at the seat tube or forward of the seat tube, (2) do not remove the rear wheel when folding, and (3) have a folded size that is larger than dimensions of the of the wheels and typically also wider than 10 inches because nothing has been done to reduce the width of the wheels at their hub centers;

GROUP B comprises bicycles such as U.S. Pat. No. 4,182,522 (Ritchie) that (1) fold the rear of the frame down and under about a horizontal axis located behind the seat tube, (2) do not remove the rear wheel when folding, (3) fold the down tube around about a vertical axis, and (3) do not remove the front wheel while creating a folded size that can be smaller than the airline 62 linear inch limit when small wheels are used; and GROUP C comprises bicycles such as U.S. Pat. No. 5,586,652 (Smilanick) that have a frame that disassembles after the front and rear wheels are removed to allow the front frame section, rear frame section, and the two wheels of a bicycle with full size wheels to be separately packed into a 26×26×10 inch case that meets the airline requirements for full-size luggage not subject to a baggage surcharge.

The main differences between the present invention and the above groups of bicycles are illustrated in the table below:

|  | Group A | Group B | Group C | Invention |
| --- | --- | --- | --- | --- |
| Frame fold axis | Vertical | Horizontal and vertical | Disassembled not folded | Horizontal |
| Fits 26 × 26 × 10 | No | Yes | Yes | Yes |
| Full size wheels | Some models | No | Yes | Yes |
| Wheels removed | Typically no | No | Yes | Yes |

The table above shows that embodiments of the present invention are similar to Group C in that a bicycle using full size wheels can fit into the 62 linear inch size, which is typically 26×26×10 inches if 700C wheels are used. Embodiments of the present invention differ from Group C in that embodiments of the present invention are based on a frame that can be folded, while bicycles in Group C have frames that are disassembled, not folded. Bicycle frame that must be disassembled instead of folded can have the following disadvantages:

(a) Assembly and disassembly can require special fasteners and/or tools;

(b) The cables that run from the front of the bike (typically on or near the handlebars) to the rear of the bike might need to be disconnected to pack the separable bicycle parts;

(c) The separable parts might need to be covered to keep them from rubbing against each other and causing damage;
(d) It might require a guide to show a user where to place each separable part; and
(e) The entire process of disassembly and packing the bicycle is likely to take significantly more time than if the bike could be folded instead.

For the above reasons, it is highly desirable to fold as many parts of the bicycle instead of disassembling and packaging these parts.

Figure 13A:
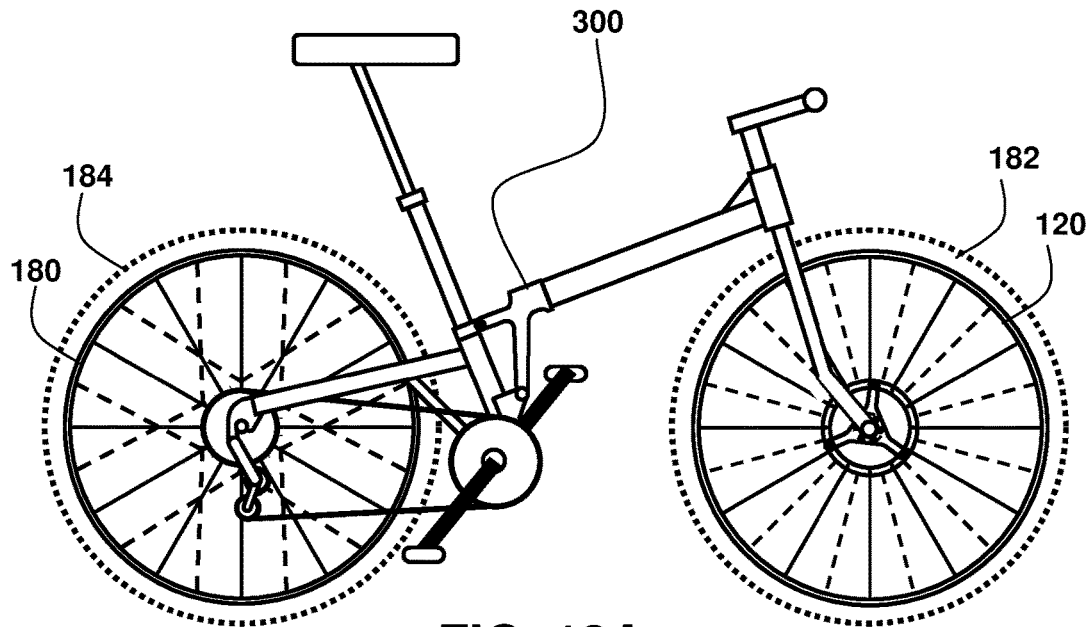
FIG. 13A shows a bicycle that comprises a folding frame and an annulus front wheel with a removable hub.
Figure 13B:
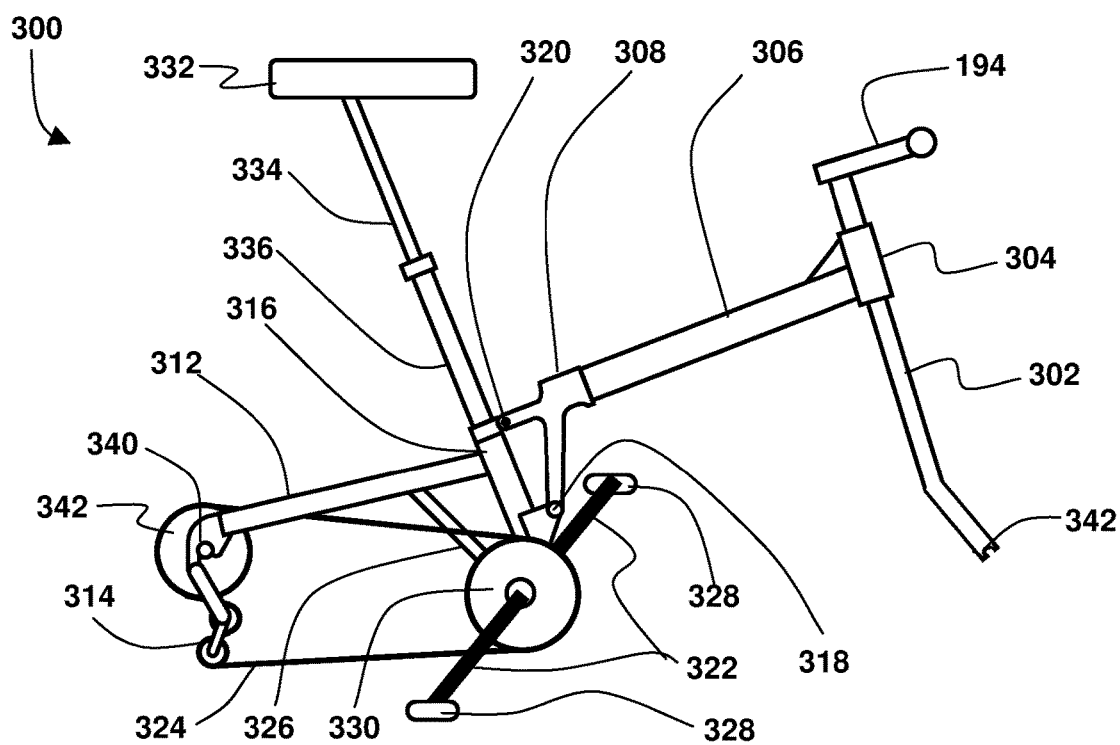
FIG. 13B shows the folding bicycle frame of FIG. 13A without the front and rear wheels.

FIG. 13A illustrates the main components of an embodiment of a human-powerable bicycle that uses a folding frame and full size wheels. The system shown in FIG. 13A is in its unpacked or "ride" mode. This system includes a folding bicycle frame 300, a spoked wheel 120 that is also a front wheel, a first tire on the first wheel 182, a second wheel 180 that is also a rear wheel, and a second tire 184 on the second wheel. FIG. 13B shows the folding bicycle frame of FIG. 13A without the wheels and tires. The folding bicycle frame 300 can have a front frame section. The front frame section can include a front tube 306, which could also be called a top tube, a front frame tube, or a down tube. A head tube 304 can be permanently attached one end of the front tube 306 and a connection module 308 (which could also be called hinge module, fold module, or adapter module) can be permanently attached to the other end of the front tube 306. The connection module 308 can comprise a front fame pivot element and a front frame fastening element. The front frame section can include a front handlebar module 194, that is attached to a front fork 302, that rotates inside the head tube 304. The front fork 302 can be configured for holding the front wheel in a pair of front dropouts 344.

Further referring to FIG. 13B, the folding bicycle frame 300 can have a rear frame section that attaches to the front frame section. The rear frame section shown in FIG. 13B has two rear stays 312, one located on the drive side (drive side rear stay) of the rear wheel and one located on the non-drive side (non-drive side rear stay) of the rear wheel when the bicycle is in ride mode, the configuration that was shown in FIG. 13A. On bicycles, the drive side is typically the right (or starboard) side and the non-drive side is typically the left (or port) side of the bicycle when viewed from the rear looking forward. The drive side is the side that the chain (or drive belt) is on. It is also the side of the wheel that will have the cog for engaging the chain or drive belt. The two rear stays 312 can also be called seat stays and in the configuration shown they perform some of the function normally performed by chain stays on a bicycle. Each of the two rear stays 312 in FIG. 13B have a rear dropout 340 at one end of the rear stay 312. The rear dropouts 340 are configured for holding a side of the center (e.g. central axle) of the rear wheel (180 in FIG. 13A). The drive-side rear stay 312 can have a rear derailleur 314 mounted near its dropout. The end of the rear stays 312 opposite of the dropouts 340 are fixedly, immovably, and permanently attached to a main seat tube 316 (which can also be called a rear frame section seat tube). The rear stays 312 and main seat tube 316 can be rotatably connected to the connection module 308 of the front section at a folding frame pivot axis 318 through the use of a rear frame pivot element that is permanently attached to the other rear frame section components, and is rotatably connected to a front frame pivot element of the connection module 308 on the front frame section. In one embodiment, a shaft and bushings are used to create the pivot or hinge.

The main seat tube 316 (and other parts of the rear frame section) can be rigidly and detachably attached to the front frame section using a rear frame fastening element 320 that is attached to the rear frame seat tube 316. This rigid connection can also be called an immovable connection. The rear frame fastening element 320 can be attached to a front frame fastening element (shown at 362 in FIG. 14A). In one embodiment, the rear frame fastening element 320 is a collar around the main seat tube, the front frame fastening element comprises holes in the connection module 308, and the rigid and detachable connection is made through the use of an eccentric cam quick release device such as that shown at 250 in FIG. 15B.

Further referring to FIG. 13B, the rear frame section can also have cranks 322 (one on each side) that are connected to the main seat tube 316 through a crankshaft and bottom bracket housing that are not visible in FIG. 13B. The bottom bracket housing is fixedly, permanently, and immovably attached to the main seat tube 316. To further clarify, the bike frame shown in FIG. 13B can have the following attributes:

(a) The frame has a front frame section and a rear frame section;
(b) The front frame section comprises a front frame tube having a head tube attached at one end and a connection module attached at the other end;
(c) The head tube is configured for rotatable attachment to a front fork;
(d) A front wheel can be mounted into the dropouts of the front fork and this front wheel could be one with a removable center section so that the front wheel fits compactly over the center of a rear wheel when the removable center section has been removed;
(e) The front fork is also configured for the attachment of a front handlebar;
(f) The front frame section has two points of engagement with the rear section, a pivot connection and a user detachable rigid (immovable) attachment connection;
(g) The user detachable connection on the front frame section is used when the bicycle is unfolded and placed into "ride" mode;
(h) The rear frame section comprises a rear frame seat tube, a bottom bracket housing, a drive side rear stay and a non-drive side rear stay, all of which are rigidly, securely, immovably, and permanently attached to each other;
(i) The pivot connection allows the front frame section to pivot relative to the rear frame section about a horizontal axis that is located in front of the seat tube; and
(j) The rigid attachment connection attaches the front frame section to the rear frame section at a point proximate to the seat post clamp.

Further referring to FIG. 13A, the rear stays 312 on each side of the rear section of the bicycle frame 300 are in an elevated chain stay configuration, which means that the bicycle chain 324 (or a belt, such as a toothed rubber belt) can be removed from the bicycle frame 300 without the loop of the bicycle chain 324 (or belt) needing to be opened or the frame needing to be opened or disassembled. This can be accomplished by having a pair of chain stays 326 (one on each side) that connect between the bottom bracket housing and a point on the rear stays 312 that is above the bicycle chain 324 (or belt). Additional components shown in FIG. 13A include pedals 328 that are connected to the cranks and could be user removable without needing any tools, a front chain ring 330 that connects the cranks 322 to the bicycle chain 324 (or belt), a seat 332, a seat post 334 that is connected to the seat 332, and a telescoping seat tube 336 that connects the seat post 334 to the main seat tube 316.

Figure 14A:
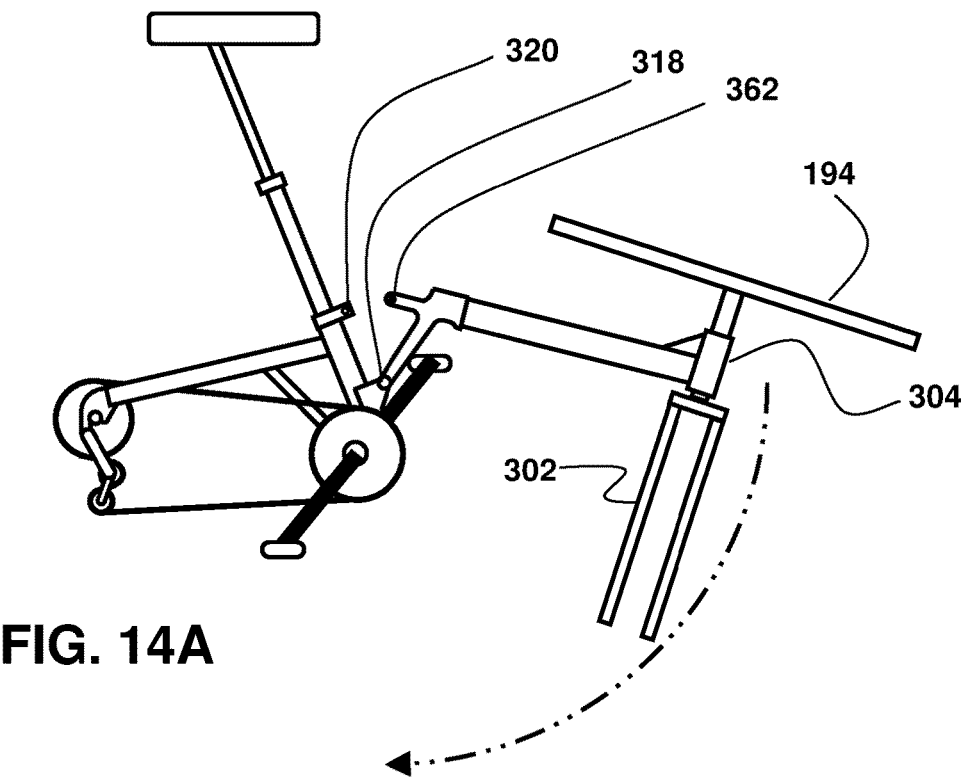
FIG. 14A shows the configuration of FIG. 13B with the front frame section rotated 30 degrees about the frame hinge point and the front fork and handlebars rotated 90 degrees.
Figure 14B:
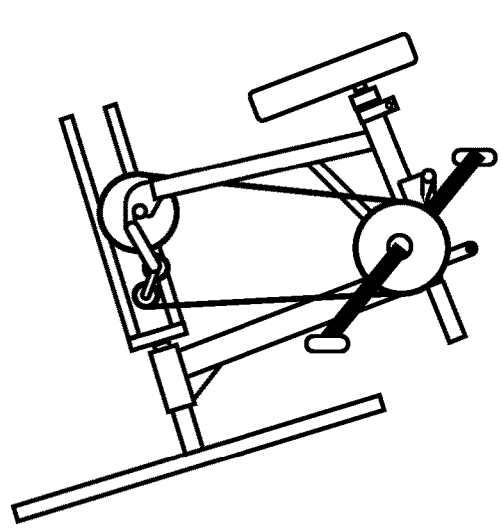
FIG. 14B shows the configuration of FIG. 14A with the front frame section now rotated 180 degrees from the original position that was shown in FIG. 13B and the seat, seat post, and telescoping seat tube moved into a compact configurations.
Figure 14C:
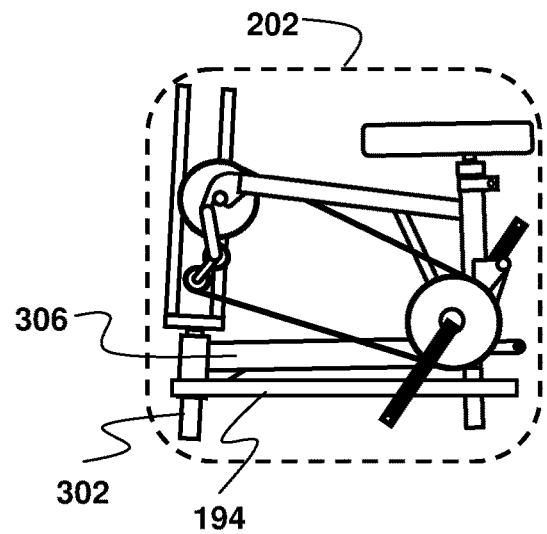
FIG. 14C shows the configuration of FIG. 14B placed into a 26×26 inch volume with the pedals removed and the handlebars stowed adjacent to the front tube.

FIG. 14A, FIG. 14B, and FIG. 14C illustrate how the frame that was shown in FIG. 13B can be manipulated to pack it into a small size. The first step, shown in FIG. 14A is to detach the rear frame fastening element 320. This allows the front frame section (comprising the head tube 304, front tube 306, and connection module 308 in FIG. 13A) to rotate clockwise about an axis that is (a) located at the folding frame pivot axis 318 (b) is perpendicular to the plane of the frame and the plane of the rear wheels, and (c) could also be defined as being parallel to the axis of rotation of the rear wheels and the axis of rotation of the crankshaft in the central axis of the hollow cylindrical bottom bracket housing. In FIG. 14A the front frame section has been rotated about 30 degrees from its original "ride" position. The front fork 302 has also been rotated about 90 degrees in the head tube 304 to more clearly reveal the front handlebar module 194. In FIG. 14B, the front frame section has been rotated approximately 180 degrees relative to the rear frame section, which means that that the parts of the front fork module 302 are between the rear stays (312 in FIG. 13B) and proximate to the rear dropouts. In FIG. 14B, the seat post and telescoping seat tube that were shown in FIG. 13B have also been nested together. When the seat post and/or the telescoping seat tube are moved as low as possible, the seat post and/or telescoping seat tube can extend downwards beyond the bottom of the main seat tube to a region below the bottom bracket housing. In FIG. 14C the pedals have been removed from the cranks and the front handlebar module 194 has been removed from the front fork 302 and packed adjacent to the front tube 306. Because the front handlebar module 194 has a substantially straight section, it can easily and compactly be strapped to the front tube 306. In one embodiment, a mounting unit for a bicycle pump can be re-purposed for securely holding the front handlebar module 194 when the frame is packed. After the steps described above, the entire folded bicycle frame fits within a 26×26 inch size, shown at 202. Using this configuration and folding technique it is possible to fit an entire bicycle frame into a size smaller than 26×26 inches, such as 24×24 inches, 24×22 inches, and/or 22×22 inches. The third dimension (thickness) of any of these folded frames can be approximately 6 inches (the width of the rear dropouts), less than 7 inches, less than 8 inches, less than 9 inches, or less than 10 inches.

Figure 15A:
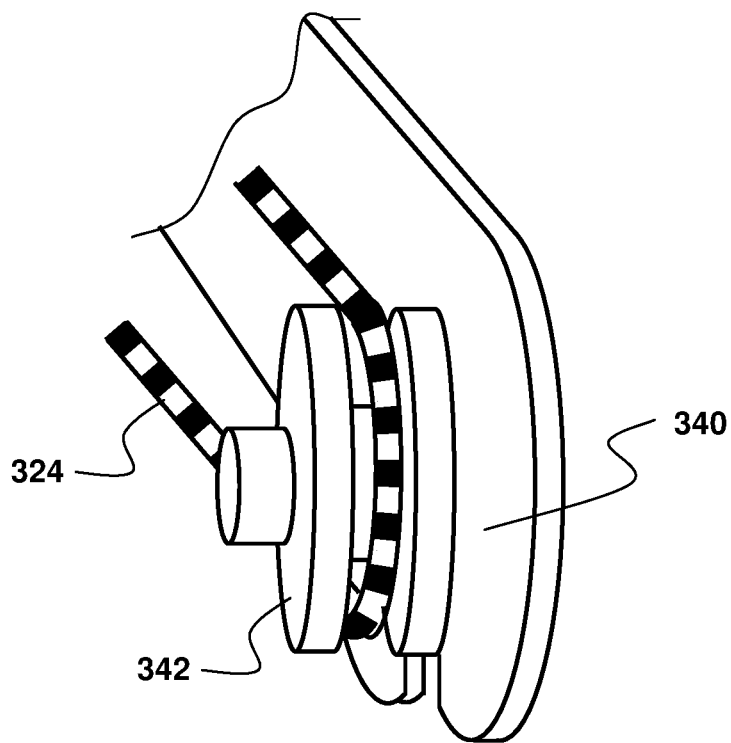
FIG. 15A shows a chain keeper that can be used to guide the chain around the rear dropout when the rear wheel has been removed, such as the configurations shown in FIG. 13B, FIG. 14A, FIG. 14B, and FIG. 14C.

When the rear wheel is removed from the frame, as shown in FIG. 13B, FIG. 14A, FIG. 14B, and FIG. 14C, the bicycle chain (324 in FIG. 13B) (or belt) is no longer connected to the rear wheel and can lay loosely in the region of the rear dropout 340, which can result in damage during transit. To remedy this situation, the rear wheel can be replaced by a chain keeper 342 that mounts into the drive side rear dropout 340 as shown in FIG. 15A and thereby guides the bicycle chain 324 (or belt). A chain keeper 342 typically comprises a toothless spool-shaped pulley that provides a slot that guides the chain (or belt) around an arc of approximately 180 degrees. The chain keeper 342 can be attached to the rear dropout using any detachable attachment method, such as mechanical hardware in the form of a bolt that goes through the pulley and nut that secures the pulley to the dropout 340.

Figure 15B:
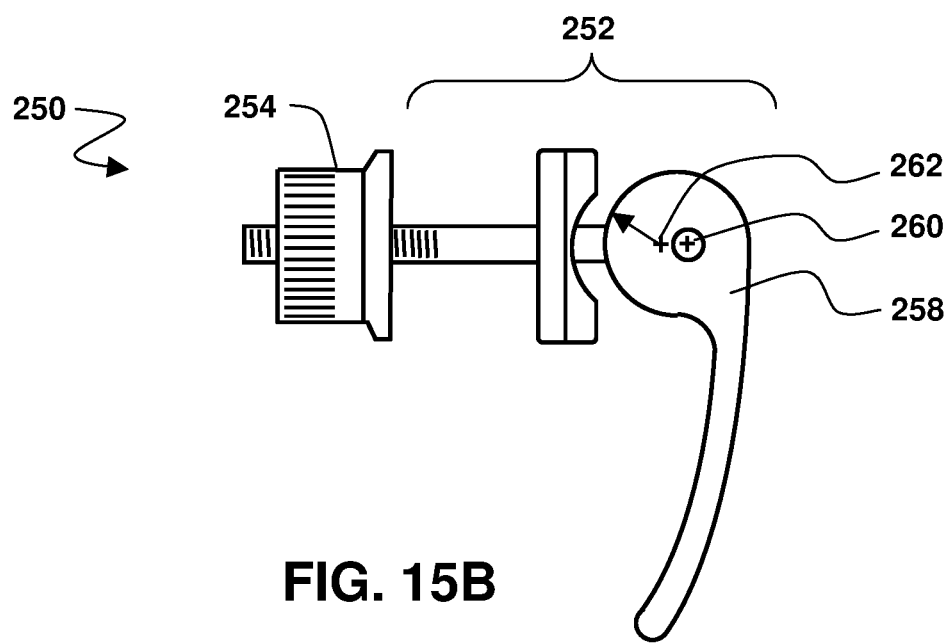
FIG. 15B shows a quick release cam mechanism suitable for use with embodiments of the present invention.

In one embodiment, the bolt and nut described with reference to the chain keeper in FIG. 15A can be replaced by an eccentric cam quick release device 250 shown in FIG. 15B. An eccentric cam quick release device 250 typically consists of a hand tightenable nut 254 that is screwed onto an eccentric cam quick release mechanism 252. Such devices 250 with M5 (5 mm) threads are typically used as quick release devices for holding bicycle wheels into dropouts and such devices 250 using M6 (6 mm) threads are typically used for clamping a seat post into a main seat tube on a bicycle. In embodiments of the present invention, such eccentric quick release devices can also be used as the user detachable upper attachment element 320 as shown in FIG. 13B, as a method for attaching a hub 216 to a wheel as illustrated in FIG. 8, to secure the chain keeper 342 to the rear dropout, as shown in FIG. 15A; to secure a seat post into a main seat tube or a telescoping seat tube; to secure a telescoping seat tube into a main seat tube; to attach wheel to a frame; to attach a rack to frame; to attach handlebars to a front fork; and/or to attach a something to a rack. Operation of the eccentric cam quick release mechanism 252 in FIG. 15B can best be understood by observing that the eccentric cam, shown at 258 has an eccentric cam center of rotation 260 that is offset from the center of curvature of the eccentric cam surface, which has been shown at 262 as a radius arrow.

Figure 16:
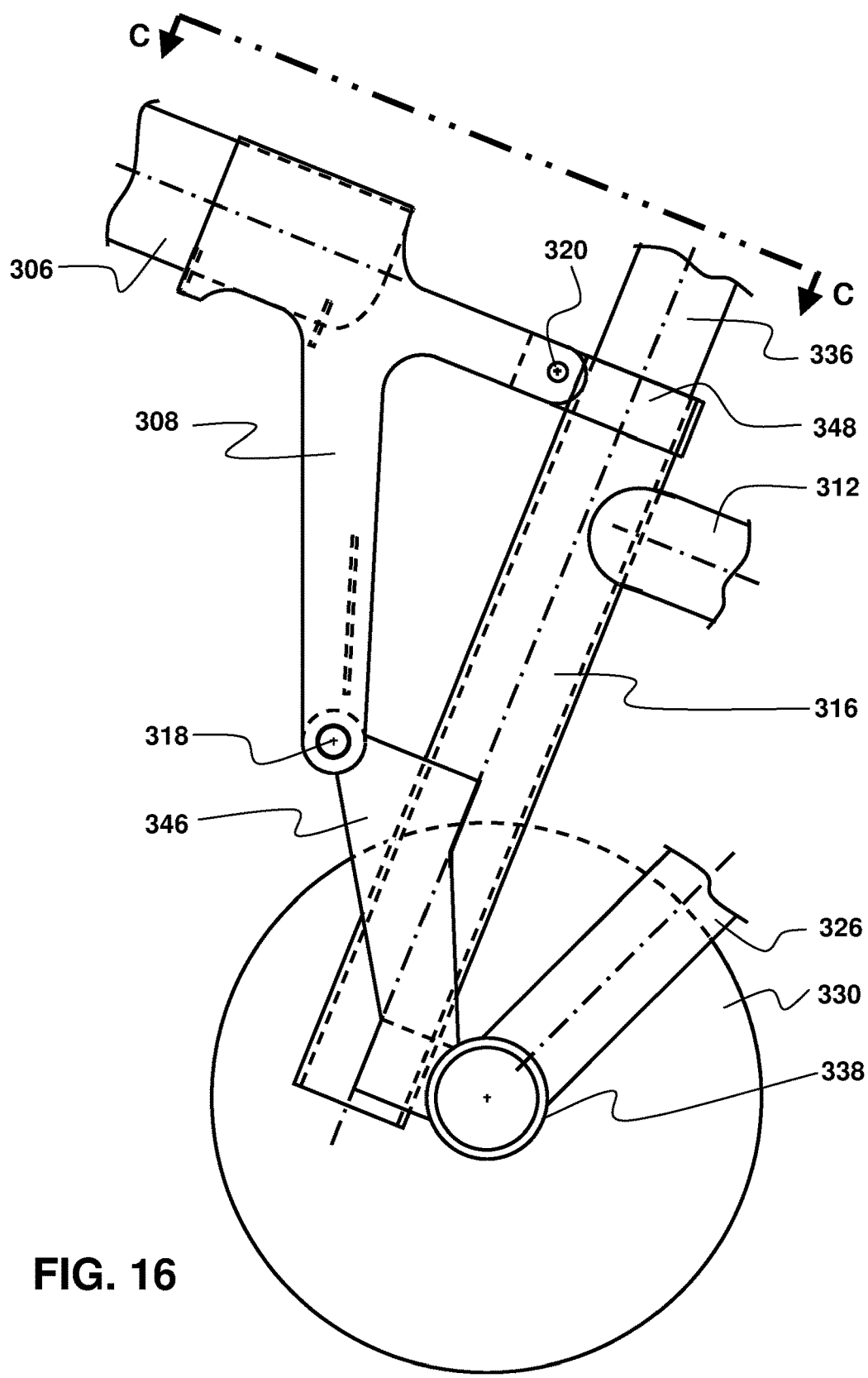
FIG. 16 shows a detailed side view of the hinge system for the folding frame of FIG. 13B in when the frame is in a ride configuration.
Figure 17:
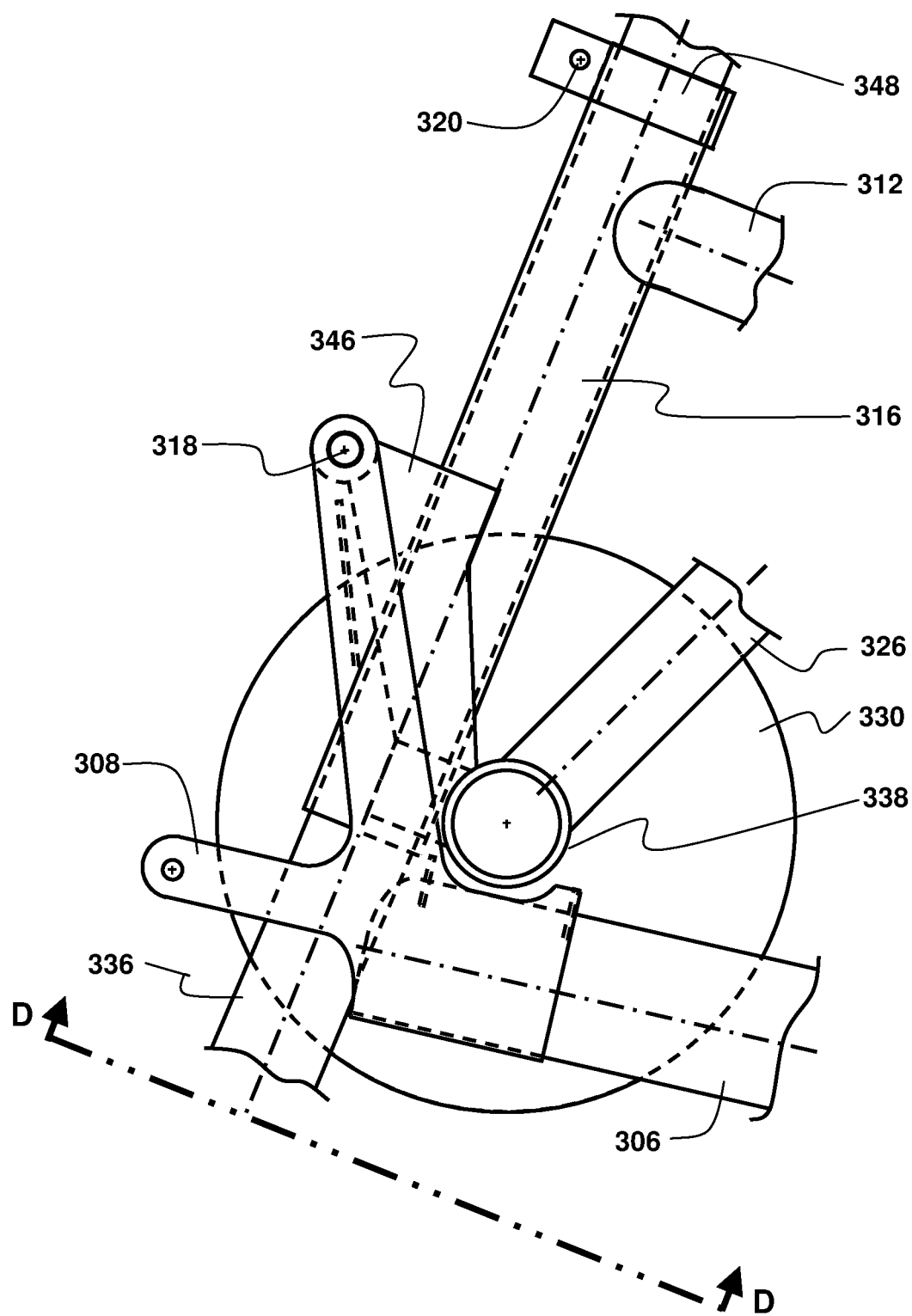
FIG. 17 shows a detailed view of the hinge system for the folding frame of FIG. 13B, FIG. 14B, and FIG. 14C in when the frame is in a packed configuration.

FIG. 16, FIG. 17, FIG. 18A and FIG. 18B provide more detail of how the front frame section of the embodiment shown in FIG. 13B, FIG. 14A, FIG. 14B, and FIG. 14C rotates relative to the rear frame section. More specifically, FIG. 16 and FIG. 17 show detailed views of the hinge assembly region when viewed from the non-drive (port) side of the bicycle frame, with parts not essential to understanding the hinging mechanism removed. Thus, the front section of the frame is to the left and the rear section of the frame is to the right, exactly opposite of the views shown in FIG. 13B, FIG. 14A, FIG. 14B, and FIG. 14C. All of the rear frame section components, except the telescoping seat tube, are in the same locations in FIG. 16 and FIG. 17. These rear frame section components include:

(a) the bottom bracket housing 338;
(b) the front chain ring 330;
(c) the chain stays 326;
(d) the rear stays 312;
(e) the main seat tube 316;
(f) the telescoping seat tube 336;
(g) the lower pivot adapter brackets 346 that rigidly, fixedly, and permanently connect the lower pivot element 318 to the main seat tube 316 and bottom bracket housing 338; and
(h) the main seat tube clamp 348 that serves as part of the user detachable upper attachment element 320 and clamps the telescoping seat tube 336 into the main seat tube 316.

In FIG. 16 the front frame section is in "ride" mode. This means that the rear frame fastening element 320 detachably secures the front frame section (and more specifically the connection module 308) to the rear frame section (and more specifically the main seat tube clamp 348). This attachment between the front frame section and the rear frame section at the rear frame fastening element 320 could be made using the eccentric cam quick release device 250 that was shown in FIG. 15B. When the frame is in "ride" mode the connection module 308 (which is part of the front frame section) is connected at both the folding frame pivot axis 318 and at the rear frame fastening element 320. The front tube is shown at 306. FIG. 16 also shows geometric relationships for the components for this folding bike frame embodiment, such as:

(a) the folding frame pivot axis 318 is located above the bottom bracket shell 338 and forward of the main seat tube 316;

(b) the rear frame fastening element 320 is located forward of the main seat tube 316 and above the folding frame pivot axis 318; and (c) the bottom section of the main seat tube 316 is located forward of the bottom bracket shell 338.

In FIG. 17 the folding frame is in "packed" mode with the front frame section rotated (counterclockwise in this view) by about 180 degrees (189 degrees to be exact) from the "ride" mode configuration that was shown in FIG. 16. This rotation of the front frame section can be understood by observing that the connection module 308 in FIG. 17 is almost exactly upside down from where it was in FIG. 16 and the front tube 306 in FIG. 17 is pointing toward the rear. One important aspect of the geometric relationship and configuration of the components of the embodiment of the folding bike frame shown in FIG. 17 is that when the front frame section has been rotated into a packed mode, the telescoping seat tube 336 and or the seat post 334 can extend out through the bottom of the main seat tube 316 and fit through an opening (or aperture) in the connection module 308. This opening or aperture in the connection module can be seen in FIG. 17 as the space where the telescoping seat post 336 extends below the main seat tube 316 and between the ears of the connection module 308.

Figure 18A:
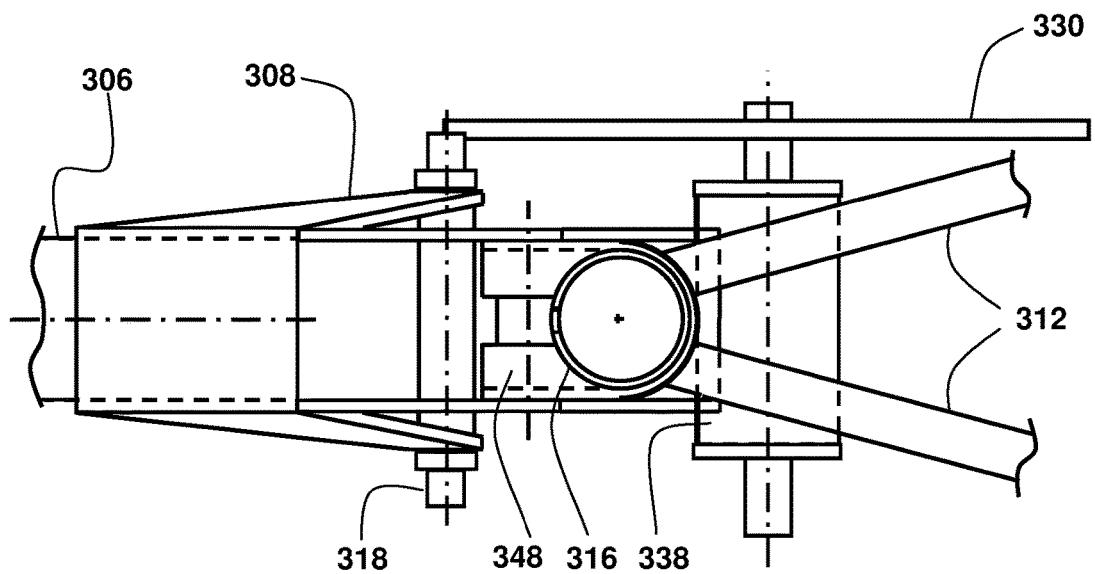
FIG. 18A shows view C-C of FIG. 16.
Figure 18B:
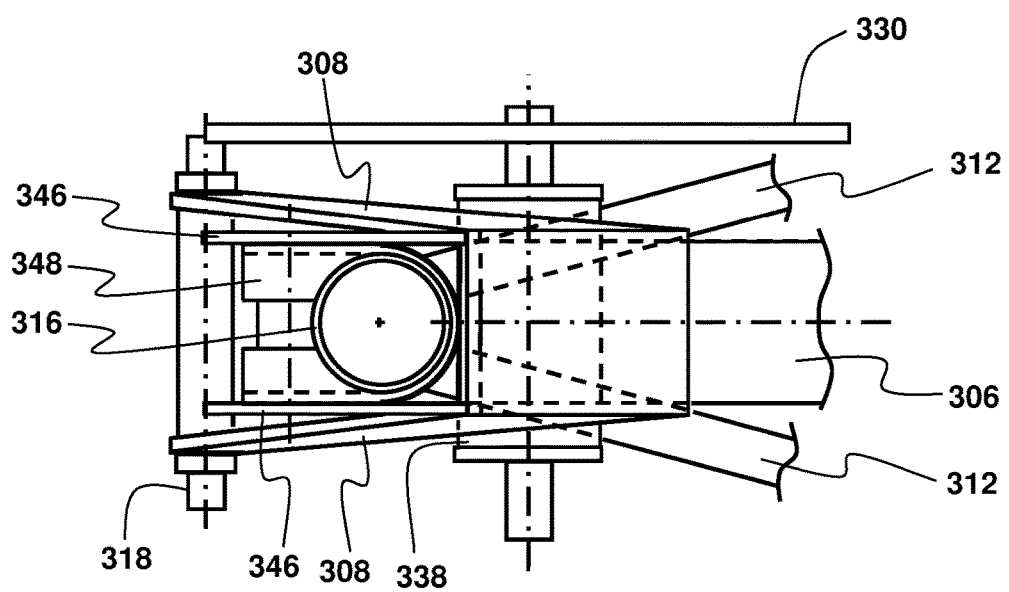
FIG. 18B shows view D-D of FIG. 17.

FIG. 18A provides a top view (view C-C of FIG. 16) of many of the components in "ride" mode that were shown in FIG. 16. FIG. 18B provides a bottom view (view D-D of FIG. 17) of the components in "packed mode" that were shown in FIG. 17. The components shown in FIG. 18A and FIG. 18B include the following rear frame components:

(a) the bottom bracket housing 338;
(b) the front chain ring 330;
(c) the rear stays 312;
(d) the main seat tube 316;
(e) the main seat tube clamp 348; and
(f) the lower pivot element 318; and the following front frame components:
(g) the hinge module 308; and
(h) the front tube 306.

Note that in FIG. 18A and in FIG. 18B, the chain stays, that connect the bottom bracket housing to the seat stays (also called rear stays) are not shown. These would be very difficult to show in these views. Also not shown, for the same reason, is the telescoping seat tube. FIG. 18B shows the lower pivot adapter brackets 346, but FIG. 18A does not, for the same reason.

Figure 19A:
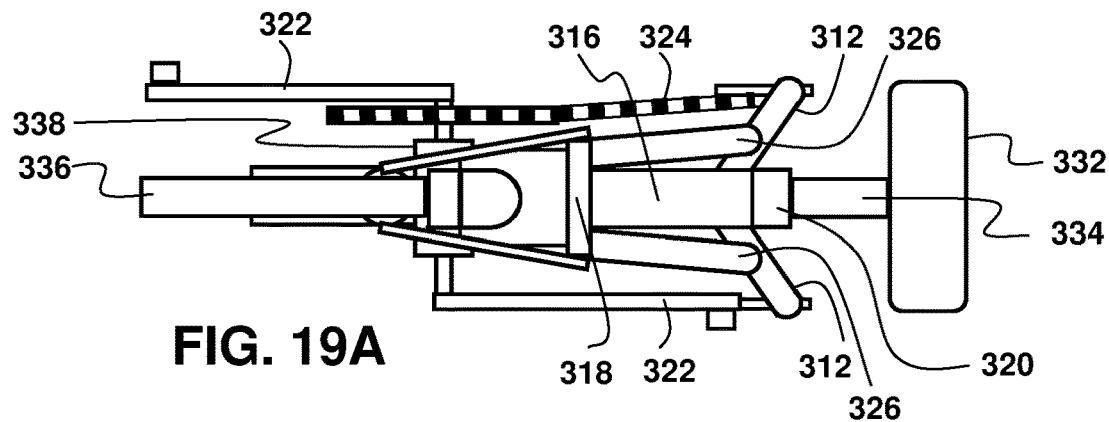
FIG. 19A shows a side view of the folded bicycle frame of FIG. 14C.
Figure 19B:
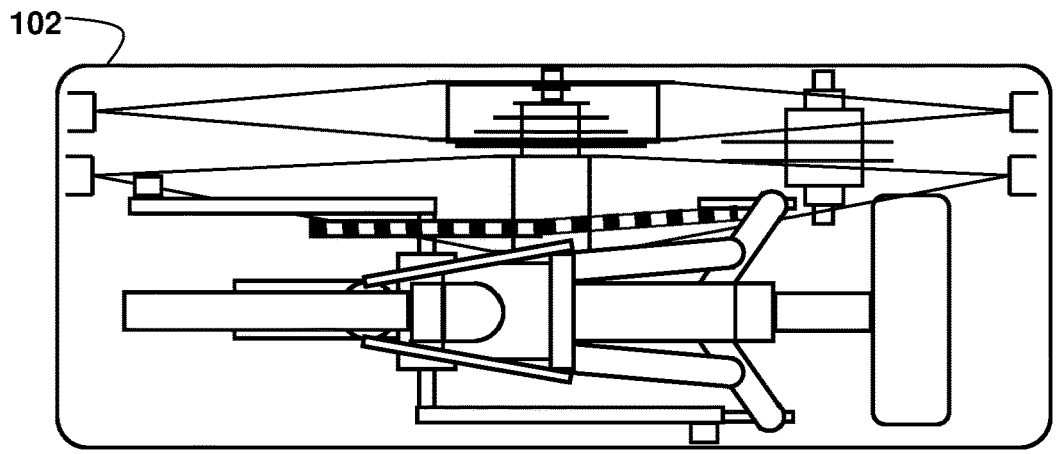
FIG. 19B shows the folded bicycle frame of FIG. 15A and the front and rear wheels of FIG. 13A packed into a 26×26×10 inch volume similar to the configuration that was shown in FIG. 1D.
Figure 19C:
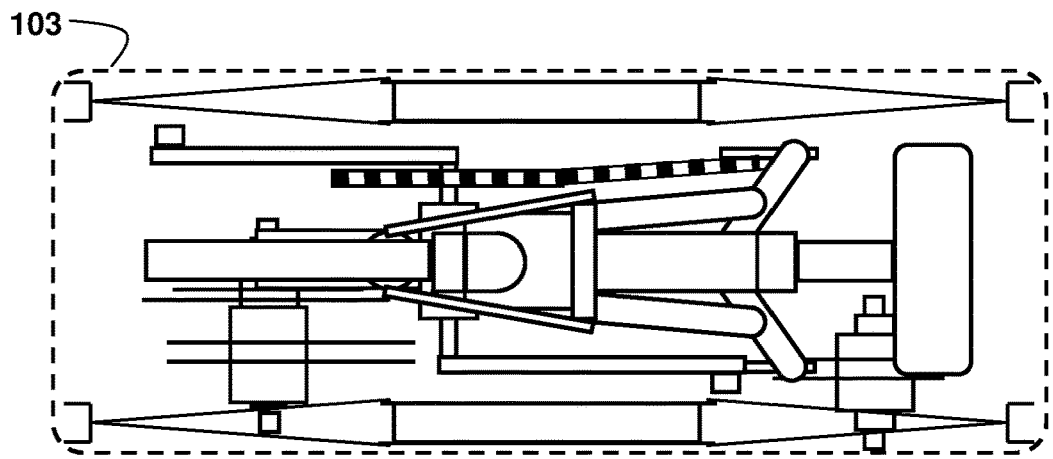
FIG. 19C shows the folded bicycle frame of FIG. 15A and the front and rear wheels of FIG. 1E packed into a 26×26×10 inch volume similar to the configuration that was shown in FIG. 1F.

FIG. 19A shows a side view (which could also be called an end view) of the folded bicycle frame of FIG. 14C. FIG. 19B adds the front and rear wheels of FIG. 13A, and packs the entire bicycle, including the wheels, into the 26×26×10 inch container 102 of the configuration that was shown in FIG. 1D. FIG. 19C packs everything into the flexible 26×26×10 inch bag 103 of the configuration that was shown in FIG. 1F. To help in understanding these illustrations:

(a) the seat is shown at 332;
(b) the rear stays are shown at 312;
(c) the bicycle chain is shown at 324;
(d) the chain stays are shown at 326;
(e) the cranks are shown at 322;
(f) the bottom bracket housing is shown at 338;
(g) the telescoping seat tube is shown at 336 as it extends below the bottom bracket housing;
(h) the lower pivot element is shown at 318;
(i) the user detachable upper attachment element is shown at 320; and
(j) the main seat tube is shown at 316.

Figure 20A:
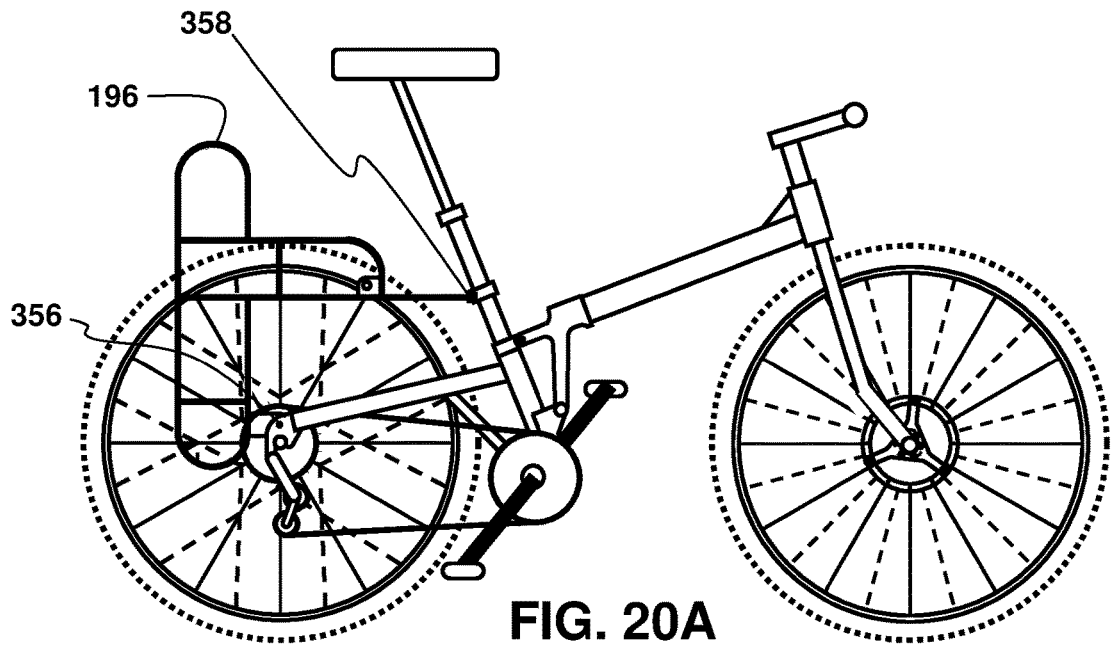
FIG. 20A shows the bicycle of FIG. 13A that further comprises a rear rack.
Figure 20B:
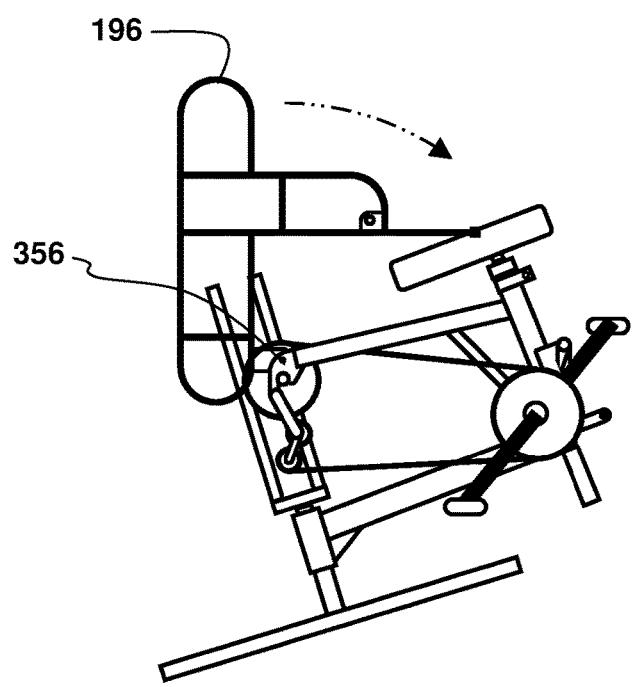
FIG. 20B shows the folded frame of FIG. 14B further comprising the rear rack of FIG. 20A to illustrate how the rear rack folds around the folded frame.

FIG. 20A shows the bicycle of FIG. 13A that further comprises a rear rack module, shown at 196. FIG. 20B shows the folded frame of FIG. 14B with the rear rack module 196 to illustrate how the rear rack module 196 rotationally folds around the folded frame while remaining attached at all times near the rear dropouts. These figures also illustrate that the rear rack module is rotationally attached to the frame a rear dropout attachment point(s) 356 and a seat tube attachment point 358 (which could also be a seat post attachment point and in this case is more specifically a telescoping seat tube attachment point). The seat tube attachment point 358 is used only when the rear rack module 196 is in "ride" mode and is detached when the rear rack module is in "packed" mode. The rear dropout attachment point(s) 356 are used in both "ride" mode and "packed" mode.

Figure 21A:
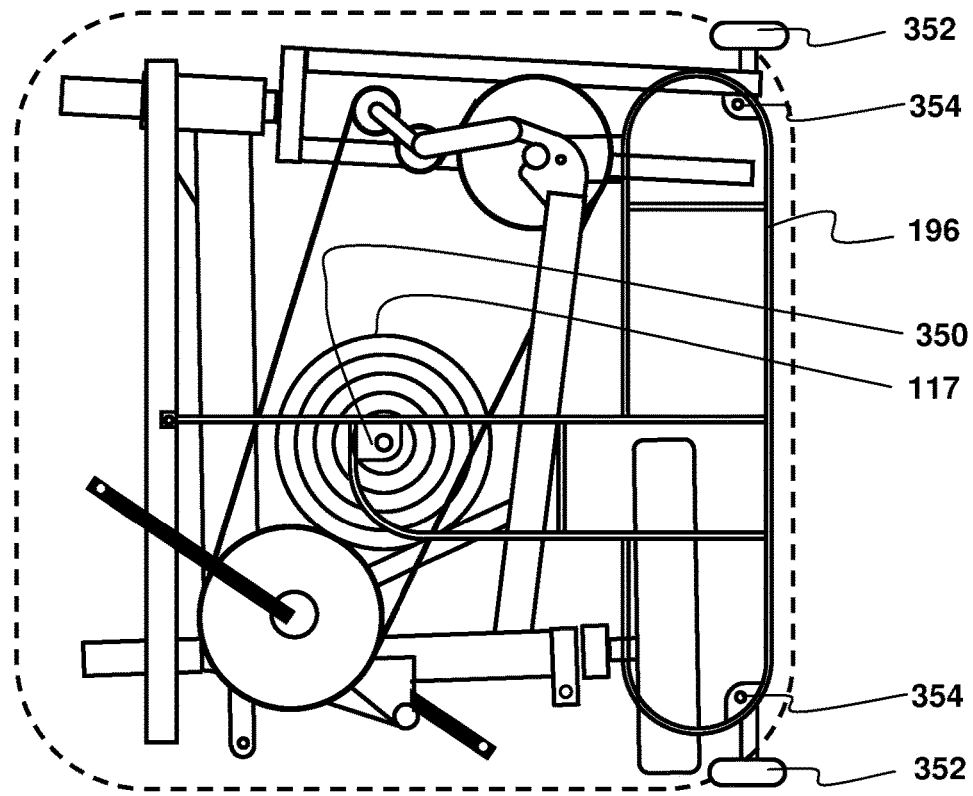
FIG. 21A shows the configuration of FIG. 14C further comprising the rear rack folded around the folded frame, the removable rear hub of FIG. 1E being held by the rear rack, and the wheels on the rear rack to aid in rolling the packed assembly.

FIG. 21A shows the configuration of FIG. 14C further comprising the rear rack module 196 folded around the folded frame. This also shows how the user detachable rear hub 117 previously shown in FIG. 1E can be held by rear rack wheel hub mounting features 350 that are part of the rear rack module 196. By providing hub mounting features 350 (that could be used for either a front wheel or a rear wheel), this wheel hub (or any other removable module configured for use in the center of a wheel) can be held in a fixed location, which means that it can be uncovered will not move and damage other packed components in transit, at as long as these other components are also held in a fixed location. Thus, the hub mounting feature 350 reduces the amount of packaging required to store and transport the folded and packed human powerable vehicle, such as the folded bike embodiment described.

Figure 21B:
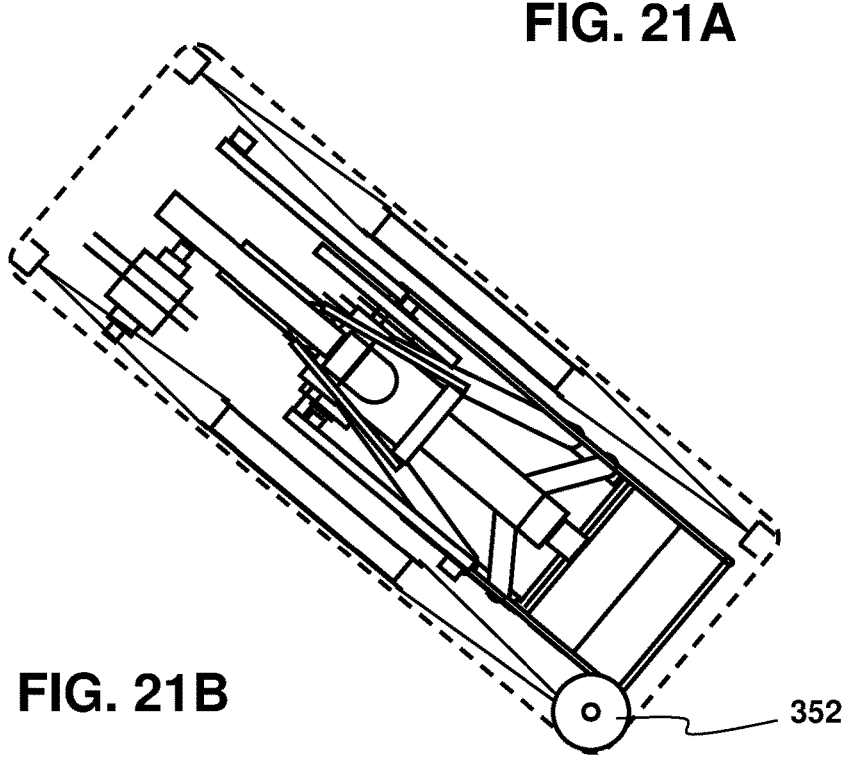
FIG. 21B shows a side view of the assembly of FIG. 21A and the removable hub front and rear wheels of FIG. 1F in a configuration that can be rolled.

FIG. 21B shows a side (or end) view of the assembly of FIG. 21A (which includes the rear rack module 196 when packaged with the removable hub front and rear wheels of FIG. 1F. The configuration shown in FIG. 21A and FIG. 21B also show two luggage wheels at 352. These luggage wheels 352 allow the folded and packed assembly to be rolled, just like other similar luggage. As shown in FIG. 21A, the luggage wheels 352 can be attached at luggage wheel attachment points 354. This attachment could be made using a cam actuated quick release device.

Figure 22A:
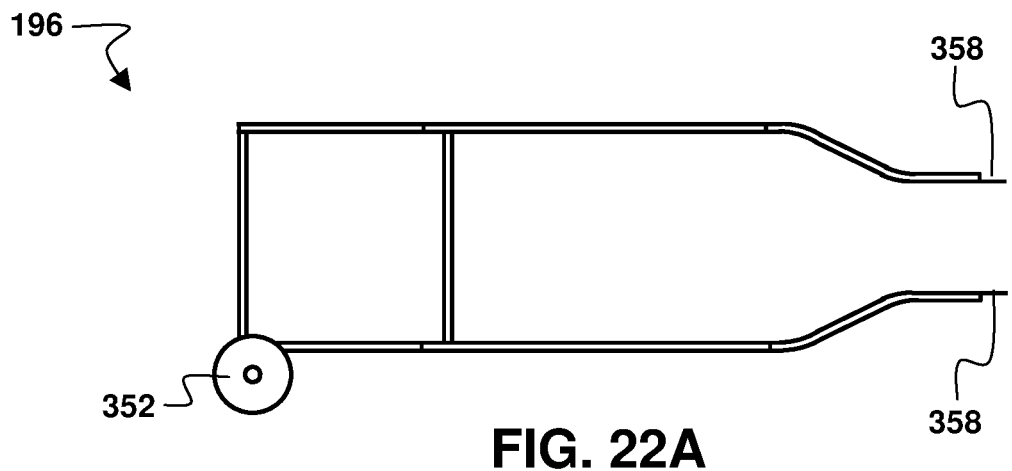
FIG. 22A shows a top view of the rear rack of FIG. 20A.
Figure 22B:
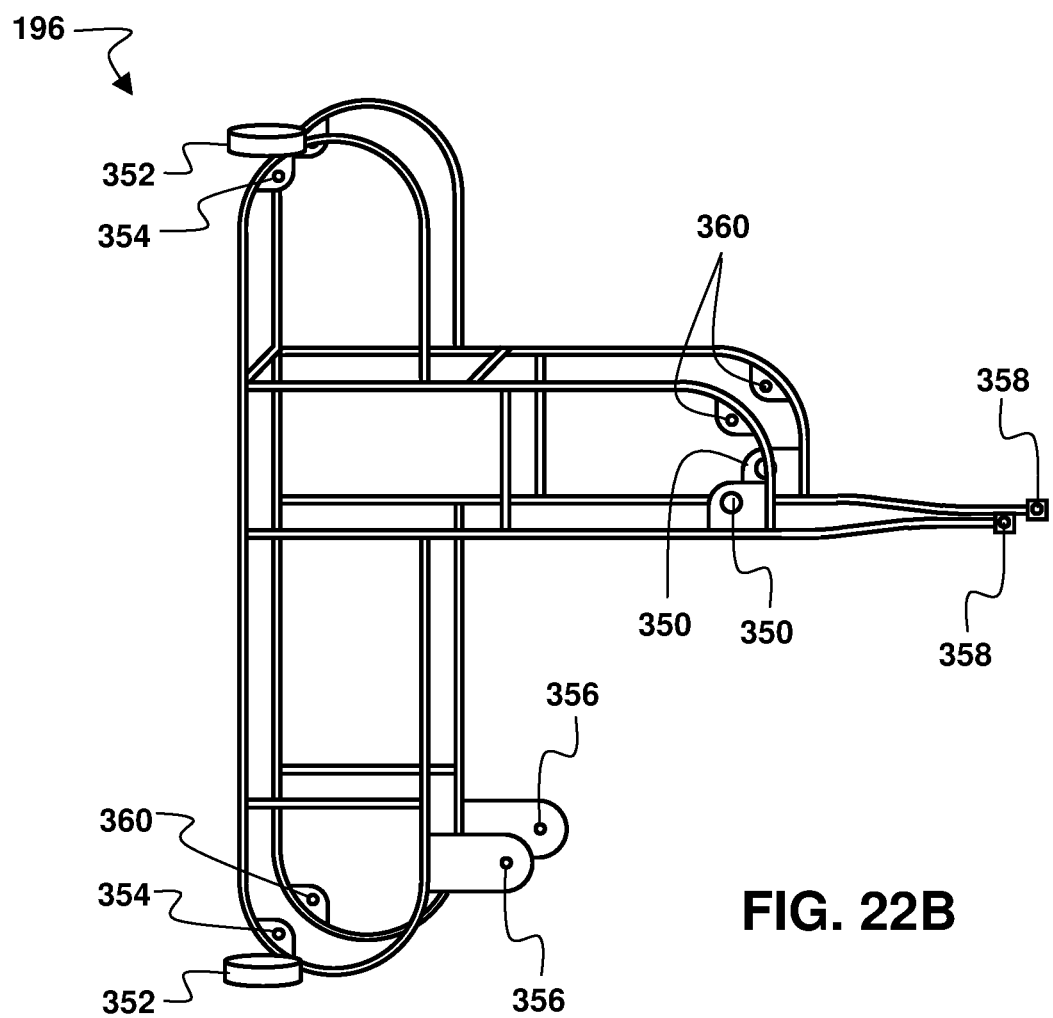
FIG. 22B shows a perspective view of the rear rack of FIG. 20A.

FIG. 22A shows a top view of the rear rack module 196 of FIG. 20A and FIG. 22B shows a perspective view of the rear rack of FIG. 20A. The luggage wheels 352 and luggage wheel attachment points 354 are shown in these figures, but the details of the adapters that connects the luggage wheels 352 to the luggage attachment points 354 have been omitted to more clearly illustrate the location the luggage wheels 352 and attachment points 354. The adapters to connect the wheels 352 to the attachment points can be any configurations using any fastening methods capable of being understood by anyone skilled in the art. The rear dropout attachment points are shown at 356. The rear rack wheel hub mounting features are shown at 350. There can also be additional rear rack module attachment points, such as those shown at 360, which can be used to further secure the parts of the rear rack module to each other or to secure other human-powerable vehicle related components to the rear rack module. The seat tube attachment points are shown at 358. The attachment between the frame and the rear rack module 196 at the seat tube attachment points 358 can be use any system or method capable of being understood by anyone skilled in the art, one example of which is the use of an eccentric cam quick release device 250 that was described with reference to FIG. 15B.

Properly constructed, a packed human powerable vehicle assembly such as that shown in this disclosure could be covered with a bag and that bag could be a suitably sized and structured bicycle pannier or panniers, totally eliminating the need for a suitcase to be carried or disposed of when the bicycle modules are reconfigured to be a ridable bicycle. This is further facilitated by the fact that bicycle panniers often have rigid sidewalls to prevent the panniers from getting pushed into the bike wheel. These rigid sidewalls become excellent penetration protection for the cover of the compacted bicycle when the panniers are reconfigured to be compacted bicycle cover.

In embodiments of the present invention, the frame can comprise any material capable of being understood by anyone skilled in the art. Examples of frame materials can include carbon steel (which comprises iron, carbon, etc and may include molybdenum and vanadium), stainless steel (which comprises nickel, iron, etc), aluminum, magnesium, titanium, glass, cardboard, carbon fiber reinforced composite, glass fiber reinforced composite, wood, plastic, or boron fiber reinforced composite. Examples of frame manufacturing processes can include welding, brazing, soldering, autoclaving, machining, molding, casting, gluing, painting, anodizing; and vacuum forming.

As noted in FIG. 13A, the first wheel and the second wheel can have tires. The tires, 182 and/or 184 can be made using any material and process capable of being understood in the art. For example, one or more of the tires 182 and/or 184, can be made of rubber. One or more of the tires can have a protective layer of an aramid (Kevlar) to help reduce the possibility of punctures One or more of the tires 182 and/or 184, can comprise metal studs. One or more of the tires 182 and/or 184, can comprise an inflatable inner tube. Inflation of the inner tube can be performed using a presta valve or a shrader valve. One or more of the tires can be tubeless. The tires can be inflated when packed. The tires can be deflated when the vehicle (bicycle) is packed.

Many human-powerable vehicles, including bicycles, comprise a transmission. This transmission can include gears located on the rear wheel. These gears can be external gears that are shifted using a rear derailleur. These gears can internal gears located in a multi-speed inner hub in the rear wheel. This multi-speed inner hub can be fixed to the spokes. This multi-speed inner hub can be removable from an annulus that uses spokes to attach to a rim. One example of a multi-speed inner hub is the 14-speed rear hub made by Rohloff in Germany.

A number of variations and modifications of the disclosed embodiments can also be used. The principles described here can also be used for in applications other than bicycles or similar human-powered vehicles, such as motorcycles. While the principles of the disclosure have been described above in connection with specific apparatuses and methods, it is to be clearly understood that this description is made only by way of example and not as limitation on the scope of the disclosure.

What is claimed is:
1. A bicycle system comprising:
a folding bicycle frame, wherein the bicycle frame comprises a front frame section connected to a rear frame section, wherein:
the front frame section comprises:
a front frame tube;
a head tube wherein:
the head tube is permanently attached to a first end of the front frame tube; and
the head tube is configured for rotatably coupling a front fork wherein the front fork is configured for securing a front wheel and handlebars; and
a connection module wherein:
the connection module is permanently attached to a second end of the front frame tube; and
the connection module comprises a front frame fastening element and a front frame pivot element;
the rear frame section comprises:
a rear frame seat tube configured for securing a seat post wherein the seat post is configured for attaching a seat:
a drive side stay with one end permanently attached to the rear frame seat tube and the other end having a drive side rear dropout configured for attachment to the drive side of a rear wheel;
a non-drive side stay with one end permanently attached to the rear frame seat tube and the other end having a non-drive side rear dropout configured for attachment of the non-drive side of the rear wheel;
a bottom bracket housing permanently attached to the rear frame seat tube wherein the bottom bracket housing comprises a hollow cylindrical section having a central axis that is configured for holding a crankshaft in a configuration in which the crankshaft rotates in a horizontal axis parallel to the rotation of the rear wheel; and
a rear frame pivot element wherein:
the rear frame pivot element is permanently attached to the rear frame seat tube and to the bottom bracket housing;
the rear frame pivot element is located forward of the rear frame seat tube and higher than the bottom bracket housing when the bicycle frame is oriented in a ridable position;
a rear frame fastening element, wherein:
the rear frame fastening element is attached to the rear frame seat tube; and
the rear frame fastening element is located above the rear frame pivot element when the bicycle frame is oriented in a ridable position;
the rear frame pivot element and the front frame pivot element are connected to form a folding bicycle frame pivot joint configured for:
rotating the front frame section relative to the rear frame section about an axis that is parallel to the central axis of the bottom bracket cylindrical section; and,
when viewed from the drive side, rotating the front frame section approximately 180 degrees clockwise to convert from a ridable configuration to a folded frame configuration for storage; and
the front frame fastening element is configured for detachable attachment to the rear frame attachment element to provide an immovable connection between the front frame section and the rear frame section when the bicycle frame is in a ridable configuration and for detachment when the front frame section will be rotated to convert the bicycle frame to a folded configuration for storage.
2. The system of claim 1 wherein:
the bottom of the rear frame seat tube is forward of and adjacent to the bottom bracket housing;
the system further comprises a telescoping seat tube wherein:

at least part of one end of the telescoping seat tube fits inside the rear frame seat tube; and the telescoping seat tube is configured for holding at least part of the seat post inside its other end;

the telescoping seat tube is secured to the rear frame seat tube using an eccentric cam quick release mechanism;

the seat post is secured to the telescoping seat tube using an eccentric cam quick release mechanism; and the connection module further comprises an aperture configured for storage of at least part of an element selected from the group of the seat post and the telescoping seat tube when the bicycle frame is in a folded configuration; and the drive side stay further comprises an elevated chain stay configured to allow a bicycle drive component selected from the group of a bicycle chain and a drive belt to be removed from the frame without disassembling a component selected from the group of the bicycle drive component and the drive side stay.

3. The system of claim 2 wherein:

the system further comprises the front fork, the seat post, the seat, the handlebars, the front wheel, and the rear wheel;

the front fork, the seat post, the seat, and the telescoping seat tube are attached to the bicycle frame when the system is configured for storage;

the system fits into a size that has a length plus width plus height of no more than 62 inches when configured for storage.

4. The system of claim 3 wherein:

the folding bicycle frame comprises titanium, nickel, and vanadium;

the system further comprises the crankshaft, a front chain ring; cranks, and user removable pedals wherein the user-removable pedals comprise pedals configured to be removed from the cranks without the use of tools;

the rear wheel further comprises an internally-geared hub;

the folding frame further comprises a toothed rubber drive belt that couples the front chain ring to the internally-geared hub;

the front wheel comprises:
nickel, brass, and aluminum;
a circular front rim comprising an outer diameter of greater than a dimension selected from the group consisting of 477 millimeters, 533 millimeters, 585 millimeters, 610 millimeters, and 648 millimeters;
a front wheel inner annular module comprising a front wheel central aperture and a front hub attachment feature;
a plurality of steel spokes in tension that connect the front rim to the front wheel inner annular module; and
a front hub configured for:
placement inside at least part of the central aperture of the front wheel inner annular module;
removable attachment to the front wheel inner annular module using the front hub attachment feature; and
attachment to the front fork;

the rear wheel comprises:
nickel, brass, and aluminum;
a circular rear rim comprising an outer diameter of greater than a dimension selected from the group consisting of 477 millimeters, 533 millimeters, 585 millimeters, 610 millimeters, and 648 millimeters;
a rear wheel inner annular module comprising a rear wheel central aperture and a rear hub attachment feature;
a plurality of steel spokes in tension that connect the rear rim to the rear wheel inner annular module; and
a rear hub configured for:
placement inside at least part of the central aperture of the rear wheel inner annular module;
removable attachment to the rear wheel inner annular module using the rear hub attachment feature;
attachment to the rear dropouts;

the front wheel inner annular module and the rear wheel inner annular module are manufactured using a water jet cutting process;

the front hub is attached to the front fork using an eccentric cam quick release device;

the rear hub is attached to the rear dropouts using an eccentric cam quick release device;

the handlebars are attached to the front fork using an eccentric cam quick release device when the bicycle frame is in its ridable configuration;

the system further comprises a rear rack wherein;
the rear rack is rotationally attached to the drive stay and the non-drive stay in a region proximate to the rear dropouts when the bicycle frame is in its ridable configuration and when the frame is in its packed configuration;
the rear rack is attached to the telescoping seat tube when the bicycle frame is in its rideable configuration;
the rear rack further comprises luggage wheels; and
the rear rack further comprises a pair of hub attachment elements configured for storing a hub selected from the group of the front hub and the rear hub;

the system further comprises tires and inner tubes, wherein:
the tires comprise an aramid material; and
the inner tubes comprise a presta valve;

the rigid connection between the front frame section and the rear frame section comprises an eccentric cam quick release mechanism;

the handlebars are strapped to the front frame section when the system is configured for storage;

at least part of the front fork is between the rear says when the system is configured for storage;

the system uses a chain keeper attached to the rear drive-side dropout when the system is configured for storage; and the system fits into a 26×26×10 inch size when configured for storage.

5. The system of claim 1 wherein:

the system comprises a telescoping seat tube wherein:
at least part of one end of the telescoping seat tube fits inside the rear frame seat tube; and the system comprises a rear rack wherein;
the rear rack is rotationally attached to the drive stay and the non-drive stay in a region proximate to the rear dropouts when the bicycle frame is in its ridable configuration and when the frame is in its packed configuration;
the rear rack is attached to the telescoping seat tube when the bicycle frame is in its rideable configuration;
the rear rack further comprises luggage wheels; and
the rear rack further comprises a pair of hub attachment elements configured for storing a hub selected from the group of the front hub and the rear hub.

6. The system of claim 1 wherein:
the drive side stay further comprises an elevated chain stay configured to allow a bicycle drive component selected from the group of a drive belt and a bicycle chain to be removed from the bicycle frame without disassembling the bicycle drive belt or chain and without disassembling any other part of the bicycle frame.

7. The system of claim 1 wherein:
the bottom of the rear frame seat tube is forward of the bottom bracket housing;
the system further comprises the front fork; and
at least part of the front fork is between the rear says when the system is configured for storage.

8. The system of claim 1 wherein:
the system comprises a telescoping seat tube wherein at least part of one end of the telescoping seat tube fits inside the rear frame seat tube;
the system comprises a seat post wherein at least part of the seat post fits inside the telescoping seat tube;
the connection module further comprises an aperture configured for storage of at least part of an element selected from the group of the seat post and the telescoping seat tube when the bicycle frame is in a folded configuration.

9. The system of claim 1 wherein:
the system further comprises the front wheel and the rear wheel; and
at least one wheel selected from the group of the front wheel and the rear wheel comprises:
a rim;
an inner annular module comprising a central aperture and a hub attachment feature;
a plurality of steel spokes in tension that connect the rim to the inner annular module; and
a hub configured for:
placement inside at least part of the central aperture in the inner annular module;
removable attachment to the inner annular module using the hub attachment feature; and
attachment to a frame component selected from the group of the front fork and the rear stays.

10. The system of claim 1 wherein:
the system further comprises the front wheel and the rear wheel; and
the system fits into a size that has a length plus width plus height of no more than 62 inches when configured for storage.

11. The system of claim 1 wherein:
the system further comprises the front wheel and the rear wheel; and
the front wheel is packed on one side of the folding bicycle frame and the rear wheel is packed on the other side of the folding bicycle frame when the system is configured for storage.

12. The system of claim 1 wherein:
the system further comprises the front wheel and the rear wheel; and
the front wheel and the rear wheel are packed on the same side of the folding bicycle frame when the system is configured for storage.

13. The system of claim 1 wherein:
fastening of the front frame to the rear frame comprises an eccentric cam;
the folding bicycle frame further comprises the front fork and the handlebars; and
an element selected from the group of the handlebars and the front fork comprises an eccentric cam.

14. The system of claim 1 wherein:
the folding bicycle frame further comprises titanium, nickel, and vanadium;
the system further comprises the front wheel and the rear wheel, which further comprise nickel, brass, and aluminum;
the system further comprises tires and inner tubes;
the tires comprise an aramid material; and
the inner tubes comprise a presta valve.

15. A folding frame for a human-powerable two-wheeled vehicle wherein:
the frame comprises a front frame section and a rear frame section;
the front frame section comprises:
a front frame tube;
a head tube connected to a first end of the front frame tube;
a front frame pivot element and a front frame fastening element attached to a second end of the front frame tube;
the rear frame section comprises:
a first seat tube:
a drive side seat stay with one end rigidly and permanently attached to the first seat tube and the other end having a rear dropout configured for attachment of a rear wheel;
a non-drive side seat stay with one end rigidly and permanently attached to the seat tube and the other end having a rear dropout configured for attachment of the rear wheel;
a bottom bracket housing rigidly and permanently attached to the first seat tube;
a rear frame pivot element rigidly and permanently attached to the first seat tube; and
a rear frame fastening element attached to the first seat tube and located higher than the rear frame pivot element;
the rear frame pivot element is connected to the front frame pivot element in a configuration wherein:
the front frame section can rotate about a horizontal axis that is:
parallel to the axis of rotation of the rear wheel in the rear dropouts;
above the bottom bracket housing; and
forward of the first seat tube;
the front frame section rotates approximately 180 degrees downwards and rearwards to convert from a ridable configuration to a folded configuration; and
the front frame fastening element is detachably connected to the rear frame fastening element to provide a rigid connection between the front frame section and the rear section when the human powerable two-wheeled vehicle is in a rideable configuration and is detached when the front frame section is rotated into a folded frame configuration.

16. The folding frame of claim 15 wherein:
the folding frame is a folding bicycle frame;
the folding frame is for a bicycle configured for a front wheel and a rear wheel with an outside rim diameter of greater than 533 mm; and
the folding frame fits into a 24×24×8 inch volume.

17. The folding frame of claim 15 wherein:
the folding frame further comprises the rear wheel, which further comprises an internally-geared hub;
the folding frame further comprises a crankshaft rotatably connected to the bottom bracket housing;

the folding frame further comprises front cranks and a front chain ring attached to the crankshaft assembly;

the folding frame further comprises a toothed rubber belt that couples the front chain ring to the internally-geared hub;

the rear frame section further comprises an elevated chain stay that connects between the bottom bracket housing and the drive side stay wherein the rear frame section is configured for removal of the toothed rubber belt from the folding frame without disassembling a component selected from the group of the toothed rubber belt and the rear frame section.

18. A bicycle system wherein:

the system comprises a front frame section and a rear frame section;

the rear frame section comprises:
 a seat tube;
 a drive side stay and a non-drive side stay configured for attaching a rear wheel;
 a crank shaft in a housing;
 a rear frame rotary connection element; and
 a rear frame detachable connection element, the seat tube, the drive side stay, non-drive side stay, the crank shaft housing, the rear frame rotary connection element, and the rear frame detachable connection element are rigidly and permanently attached to each other;

the rear frame rotary connection element is located above and forward of the axis of rotation of the crank shaft when the bicycle system is in a rideable orientation;

the rear frame fixed connection element is located above the rear frame rotary connection element when the bicycle system is in a rideable orientation;

the front frame section comprises a head tube located opposite of a front frame rotary connection element and a front frame detachable connection element;

the rear frame rotary connection element is rotatably connected to the front frame rotary connection element in a configuration wherein:
 the rear frame section is immovably attached to the front frame section when the rear frame detachable connection element is attached to the front frame detachable connection element;
 rotation of the rear frame section relative to the front frame section occurs about an axis parallel to the axis of rotation of the crank shaft when the rear frame detachable connection element is detached from the front frame detachable connection element;
 rotation of the rear frame section relative to the front frame section comprises a rotation of approximately 180 degrees from a rideable configuration to a packable configuration.

19. The bicycle system of claim 18 wherein:

the drive side stay further comprises an elevated chain stay configured to allow a bicycle drive component selected from the group of a bicycle chain and a drive belt to be removed from the frame without disassembling any part of the system.

20. The bicycle system of claim 18 wherein:

the system further comprises a rear rack;

the rear rack is rotatably attached to the drive side stay and the non-drive side stay in a region proximate to the locations on the drive and non-drive side stays where the rear wheel attaches;

the rear rack rotates about an axis parallel to the axis of rotation of the crank shaft when the bicycle system is folded from a rideable configuration to a packable configuration.

\* \* \* \* \*